(12) United States Patent
Atungsiri

(10) Patent No.: US 10,382,241 B2
(45) Date of Patent: Aug. 13, 2019

(54) RECEPTION OF SIGNALING DATA IN FREQUENCY DIVISION MULTIPLEXED BROADCAST SYSTEM

(71) Applicant: Sony Corporation, Minato-ku (JP)

(72) Inventor: Samuel Asangbeng Atungsiri, Weybridge (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/230,320

(22) Filed: Dec. 21, 2018

(65) Prior Publication Data

US 2019/0123947 A1 Apr. 25, 2019

Related U.S. Application Data

(63) Continuation of application No. PCT/GB2017/051322, filed on May 12, 2017.

(30) Foreign Application Priority Data

Jun. 24, 2016 (GB) .................................. 1611072.8

(51) Int. Cl.
*H04L 27/26* (2006.01)
*H04L 5/00* (2006.01)

(52) U.S. Cl.
CPC .......... *H04L 27/265* (2013.01); *H04L 5/0007* (2013.01); *H04L 5/0044* (2013.01); *H04L 27/2656* (2013.01)

(58) Field of Classification Search
CPC ... H04L 27/265; H04L 5/0007; H04L 5/0044; H04L 27/2656
See application file for complete search history.

(56) References Cited

U.S. PATENT DOCUMENTS

2014/0294124 A1 10/2014 Atungsiri et al.
2016/0050667 A1* 2/2016 Papasakellariou .......... H04W 74/0808
370/329

(Continued)

FOREIGN PATENT DOCUMENTS

GB 2515854 1/2015
GB 2532233 5/2016

(Continued)

OTHER PUBLICATIONS

International Search Report dated Sep. 19, 2017 in PCT/GB2017/051323, filed on May 12, 2017 (with Written Opinion).

(Continued)

*Primary Examiner* — Kabir A Timory
(74) *Attorney, Agent, or Firm* — Oblon, McClelland, Maier & Neustadt, L.L.P.

(57) ABSTRACT

A receiver detects and recovers payload data from a received signal. The receiver comprises a radio frequency demodulation circuit configured to detect and to recover the received signal, the received signal having been formed and transmitted by a transmitter to carry the payload data from a plurality of different channels as Orthogonal Frequency Division Multiplexed (OFDM) symbols in one or more of a plurality of transmission frames, each of the transmission frames comprising a frame synchronisation OFDM symbol, followed by one or more primary signalling OFDM symbols, then one or more secondary signalling OFDM symbols followed by one or more payload OFDM symbols. The frame synchronisation OFDM symbol and the one or more primary signalling OFDM symbols have been modulated with a signature sequence, the signature sequence of the one or more primary signalling OFDM symbols having been (Continued)

cyclically shifted with respect to each of a preceding one of the frequency synchronisation OFDM symbol or the one or more primary signalling OFDM symbols, with the cyclical shift primary signalling data carried in the one or more primary signalling OFDM symbols. The receiver further comprises a Fourier transformer configured to convert successively a temporal length of a useful part each of the frequency synchronisation OFDM symbol and the one or more primary signalling OFDM symbols into the frequency domain, a multiplier configured to receive each of the frequency domain samples of a current one of the primary signalling OFDM symbols and to multiply each sample with the conjugate of a corresponding sample of one of the frame synchronisation OFDM symbols or one of the one or more primary signalling OFDM symbols immediately preceding the current one of the primary signalling OFDM symbols to produce for each sub-carrier sample an intermediate sample, an inverse Fourier transformer configured to convert the intermediate samples resulting from the current one of the primary OFDM symbols into the time domain, and a cyclic shift detector configured to estimate the primary signalling data conveyed by each of the one or more primary signalling OFDM symbols by detecting a cyclic shift of the signature sequence present in each of the one or more primary signalling OFDM symbols from a peak of the time domain intermediate samples.

16 Claims, 12 Drawing Sheets

(56) References Cited

U.S. PATENT DOCUMENTS

| | | | |
|---|---|---|---|
| 2017/0026152 A1 | 1/2017 | Atungsiri et al. | |
| 2017/0026219 A1 | 1/2017 | Atungsiri | |
| 2017/0026220 A1 | 1/2017 | Atungsiri | |
| 2017/0026221 A1 | 1/2017 | Atungsiri | |
| 2017/0338994 A1 | 11/2017 | Atungsiri | |
| 2018/0139021 A1 | 5/2018 | Atungsiri | |
| 2018/0145864 A1 | 5/2018 | Atungsiri | |
| 2018/0205509 A1 | 7/2018 | Atungsiri | |
| 2018/0241464 A1* | 8/2018 | Michaels | H04B 7/0617 |

FOREIGN PATENT DOCUMENTS

| | | |
|---|---|---|
| WO | WO 2014/155063 | 10/2014 |
| WO | WO 2014/155064 | 10/2014 |
| WO | WO 2014/155104 | 10/2014 |
| WO | WO 2014/195303 | 12/2014 |
| WO | WO 2015/001298 | 1/2015 |
| WO | WO 2015/001313 | 1/2015 |

OTHER PUBLICATIONS

International Search Report dated Sep. 20, 2017 in PCT/GB2017/051322, filed on May 12, 2017 (with Written Opinion).

Zoellner, J, et al. "A Power Efficient Framing Structure for a Next Generation Mobile Broadcast System," IEEE International Symposium on Broadband Multimedia Systems and Broadcasting, 2011, pp. 6.

Levanen, T et al. "Radio Interface Evolution Towards 5G and Enhanced Local Area Communications," IEEE Access, vol. 2, 2014, pp. 25.

ATSC Candidate Standard: System Discovery and Signaling(Doc. A/321 Part 1), Advanced Television Systems Committee, Doc. S32-231 r4, May 6, 2015, pp. 20.

He, D. et al. "System Discovery and Signaling Transmission Using Bootstrap in ATSC 3.0," IEEE Transactions on Broadcasting, vol. 62, No. 1, Mar. 2016, pp. 9.

Huang, Y. et al "A novel preamble design using LDM," IEEE, 978-1-4673-9044-6/16, 2016, pp. 5.

Fay, L. et al. "An Overview of the ATSC 3.0 Physical Layer Specification," IEEE Transactions on Broadcasting, vol. 62, No. 1, Mar. 2016, pp. 13.

"ATSC Standard: A/321, System Discovery and Signaling," Advanced Television Systems Committee, Doc. A/321:2016, Mar. 23, 2016, pp. 28.

"ATSC Candidate Standard: System Discovery and Signaling (Doc. A/321 Part 1)," Advanced Television Systems Committee, Doc. S32-231r6, Jul. 15, 2015, pp. 28.

"ATSC Proposed Standard: Physical Layer Protocol (A/322)," Advanced Television Systems Committee, Doc. S32-230r46, May 6, 2016, pp. 256.

* cited by examiner

RECEPTION OF SIGNALING DATA IN FREQUENCY DIVISION MULTIPLEXED BROADCAST SYSTEM

CROSS REFERENCE TO RELATED APPLICATIONS

The present application claims priority to United Kingdom Application 1611072.8 filed on 24 Jun. 2016 and in a bypass continuation application of PCT application PCT/GB2017/051322 filed 12 May 2017, the contents of which being incorporated herein by reference in their entirety.

FIELD OF THE DISCLOSURE

The present disclosure relates to receivers and methods of receiving payload data using Orthogonal Frequency Division Multiplexed (OFDM) symbols.

The present disclosure claims the Paris convention priority to UK1611072.8 the contents of which are herein incorporated by reference.

BACKGROUND OF THE DISCLOSURE

There are many examples of radio communications systems in which data is communicated using Orthogonal Frequency Division Multiplexing (OFDM). Television systems which have been arranged to operate in accordance with Digital Video Broadcasting (DVB) standards for example, use OFDM for terrestrial and cable transmissions. OFDM can be generally described as providing K narrow band sub-carriers (where K is an integer) which are modulated in parallel, each sub-carrier communicating a modulated data symbol such as for example Quadrature Amplitude Modulated (QAM) symbol or Quaternary Phase-shift Keying (QPSK) symbol. The modulation of the sub-carriers formed in the frequency domain and transformed into the time domain for transmission. Since the data symbols are communicated in parallel on the sub-carriers, the same modulated symbols may be communicated on each sub-carrier for an extended period. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols. During transmission, a guard interval filled by a cyclic prefix of the OFDM symbol precedes each OFDM symbol. When present, the guard interval is dimensioned to absorb any echoes of the transmitted signal that may arise from multipath propagation.

It has been proposed for a television system known as the Advanced Television Systems Committee (ATSC) 3.0 in a publication entitled ATSC 3.0 Working Draft System Discovery and Signaling [1] to include a preamble in a transmitted television signal which is carrying broadcast digital television programmes. The preamble includes a so called "bootstrap" signal which is intended to provide a receiver with a part of the transmitted signal which can have a greater likelihood of detecting and therefore can serve as a signal for initial detection. This is because broadcasters anticipate providing multiple services, within a broadcast signal in addition to just broadcast television.

However, in ISDB-T, a present standard for broadcast networks that employ OFDM where services are time-division multiplexed (TDM) together in a single channel, a problem exists in that once the tuner has been set, capacity for mobile services is limited. Given the increasing demand for mobile television, such a problem is becoming increasingly pertinent.

It is proposed that for the next standard, ISDB-T3, a frame structure is designed which can be configured for either frequency division multiplexing (FDM) or TDM. Such a frame structure is proposed herein, and defined with regard to embodiments of the present technique.

SUMMARY OF THE DISCLOSURE

Various further aspects and embodiments of the disclosure are provided in the appended claims, including a transmitter and a method of transmitting.

According to embodiments of the present disclosure, there is provided a receiver for detecting and recovering payload data from a received signal. The receiver comprises a radio frequency demodulation circuit configured to detect and to recover the received signal, the received signal having been formed and transmitted by a transmitter to carry the payload data from a plurality of different channels as Orthogonal Frequency Division Multiplexed (OFDM) symbols in one or more of a plurality of transmission frames, each of the transmission frames comprising a frame synchronisation OFDM symbol, followed by one or more primary signalling OFDM symbols, then one or more secondary signalling OFDM symbols followed by one or more payload OFDM symbols. The one or more payload OFDM symbols carry payload data from one of a plurality of time frames for each of the plurality of different channels. The frame synchronisation OFDM symbol and the one or more primary signalling OFDM symbols have been modulated with a signature sequence, the signature sequence of the one or more primary signalling OFDM symbols having been cyclically shifted with respect to each of a preceding one of the frequency synchronisation OFDM symbol or the one or more primary signalling OFDM symbols, with the cyclical shift primary signalling data carried in the one or more primary signalling OFDM symbols. The receiver further comprises a Fourier transformer configured to convert successively a temporal length of a useful part each of the frequency synchronisation OFDM symbol and the one or more primary signalling OFDM symbols into the frequency domain, a multiplier configured to receive each of the frequency domain samples of a current one of the primary signalling OFDM symbols and to multiply each sample with the conjugate of a corresponding sample of one of the frame synchronisation OFDM symbols or one of the one or more primary signalling OFDM symbols immediately preceding the current one of the primary signalling OFDM symbols to produce for each sub-carrier sample an intermediate sample, an inverse Fourier transformer configured to convert the intermediate samples resulting from the current one of the primary OFDM symbols into the time domain, and a cyclic shift detector configured to estimate the primary signalling data conveyed by each of the one or more primary signalling OFDM symbols by detecting a cyclic shift of the signature sequence present in each of the one or more primary signalling OFDM symbols from a peak of the time domain intermediate samples.

In some examples the frame synchronisation OFDM symbol and the one or more primary signalling OFDM symbols have been transmitted in a bandwidth which is equal to a radio frequency transmission bandwidth, and the one or more secondary signalling OFDM symbols and the one or more payload OFDM symbols have been transmitted in the radio frequency transmission bandwidth with each of the one or more secondary signalling OFDM symbols and the one or more payload OFDM symbols being divided in frequency to provide a plurality of frequency segments, each of the frequency segments carrying payload data from a different channel The one or more secondary OFDM symbols in each frequency segment carry one instance of a plurality of instances of physical layer signalling for detecting and recovering the payload data for each channel transmitted in the frequency segment from a corresponding segment of the one or more payload OFDM symbols, and the one or more primary signalling OFDM symbols carry primary signalling data for detecting the secondary signalling OFDM symbols.

The present disclosure is supported by our co-pending patent applications numbers PCT/GB2014/050869, GB1305805.2, PCT/GB2014/050868, GB1305797.1, GB1305799.7, U.S. Ser. No. 14/22,6937, PCT/GB2014/050870, GB1305795.5, PCT/GB2014/050954, GB1312048.0, TW103121570, PCT/GB2014/051679, EP13170706.9, PCT/EP2014/061467, GB1403392.2, GB1405037.1, TW103121568 and PCT/GB2014/051922, GB1420117.2 the entire contents of which are incorporated herein by reference.

Various further aspects and features of the present disclosure are defined in the appended claims, which also include a method of transmitting payload data.

BRIEF DESCRIPTION OF THE DRAWINGS

Embodiments of the present disclosure will now be described by way of example only with reference to the accompanying drawings in which like parts are provided with corresponding reference numerals and in which FIG. 1 provides a schematic diagram illustrating an arrangement of a broadcast transmission network.

DETAILED DESCRIPTION OF EXAMPLE EMBODIMENTS

Embodiments of the present disclosure can be arranged to form a transmission network for transmitting signals representing data including video data and audio data so that the transmission network can, for example, form a broadcast network for transmitting television signals to television receiving devices. In some examples the devices for receiving the audio/video of the television signals may be mobile devices in which the television signals are received while on the move. In other examples the audio/video data may be received by conventional television receivers, which may be stationary and may be connected to a fixed antenna or antennas.

Television receivers may or may not include an integrated display for television images and may be recorder devices including multiple tuners and demodulators. The antenna(s) may be inbuilt to television receiver devices. The connected or inbuilt antenna(s) may be used to facilitate reception of different signals as well as television signals. Embodiments of the present disclosure are therefore configured to facilitate the reception of audio/video data representing television programs to different types of devices in different environments.

As will be appreciated, receiving television signals with a mobile device while on the move may be more difficult because radio reception conditions will be considerably different to those of a conventional television receiver whose input comes from a fixed antenna.

Figure 1:
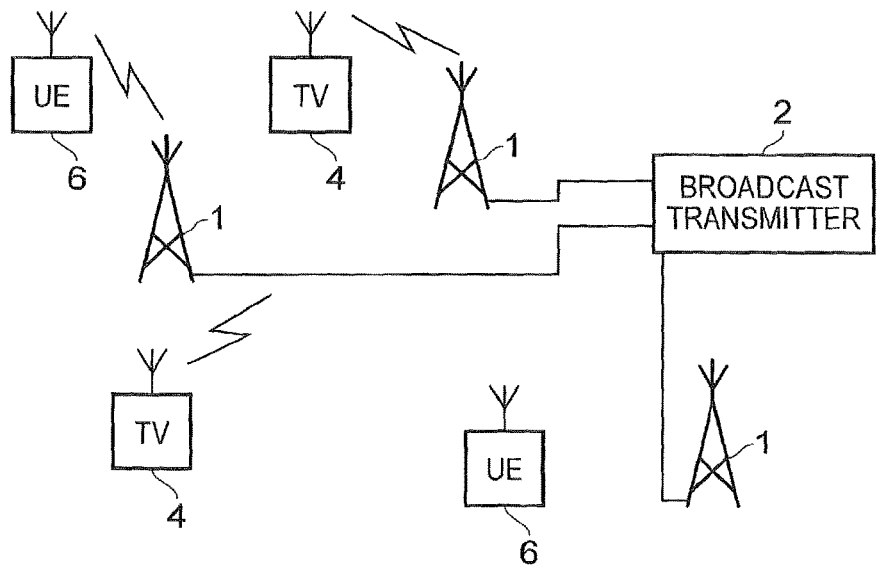

An example illustration of a television broadcast system is shown in FIG. 1. In FIG. 1 broadcast television base stations 1 are shown to be connected to a broadcast transmitter 2. The broadcast transmitter 2 transmits signals from base stations 1 within the coverage area of the broadcast network. The television broadcast network shown in FIG. 1 may operate as a so called multi-frequency network where each television broadcast base station 1 transmits its signal on a different frequency than other neighbouring television broadcast base stations 1. The television broadcast network shown in FIG. 1 may also operate as a so called single frequency network in which each of the television broadcast base stations 1 transmit the radio signals conveying audio/video data contemporaneously so that these can be received by television receivers 4 as well as mobile devices 6 within the coverage area of the broadcast network. For the example shown in FIG. 1 the signals transmitted by the broadcast base stations 1 are transmitted using Orthogonal Frequency Division Multiplexing (OFDM) which can provide an arrangement for transmitting the same signals from each of the broadcast stations 2 which can be combined by a television receiver even if these signals are transmitted from different base stations 1. Provided a spacing of the broadcast base stations 1 is such that the propagation time between the signals transmitted by different broadcast base stations 1 is less than or does not substantially exceed a guard interval that precedes the transmission of each of the OFDM symbols then a receiver device 4, 6 can receive the OFDM symbols and recover data from the OFDM symbols in a way which combines the signals transmitted from the different broadcast base stations 1. Examples of standards for broadcast networks that employ OFDM in this way include DVB-T, DVB-T2 and ISDB-T.

Figure 2:
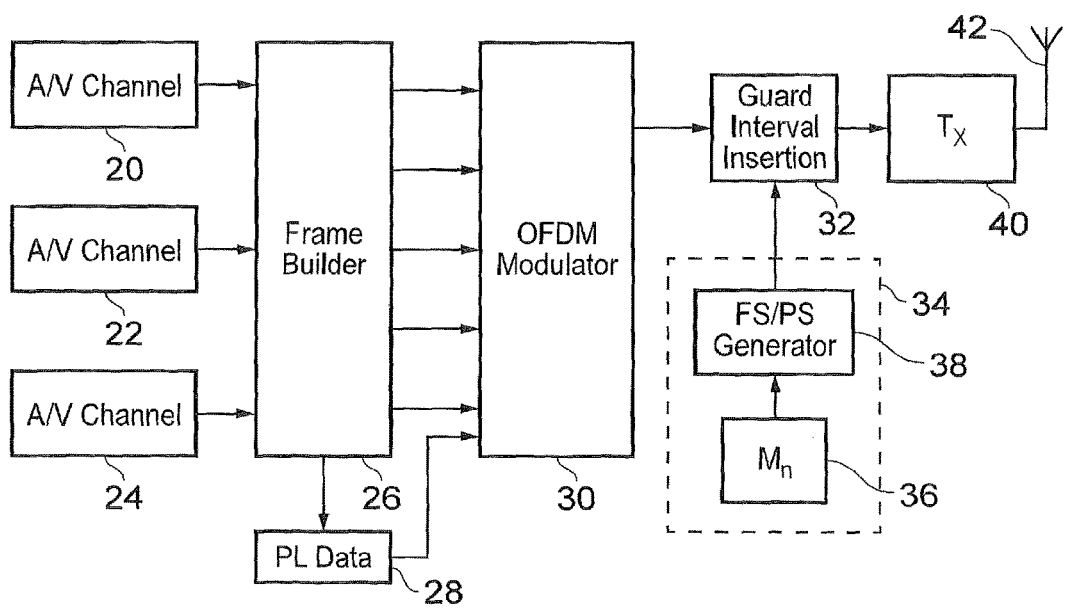
FIG. 2 provides a schematic block diagram illustrating an example transmission chain for transmitting broadcast data via the transmission network of FIG. 1.

An example block diagram of a transmitter forming part of the television broadcast base stations 1 for transmitting data from audio/video sources is shown in FIG. 2. In FIG. 2 different audio/video channels 20, 22, 24 generate different audio/video data representing television programmes or content. The audio/video data is encoded and modulated before being fed to a frame builder 26. The frame builder 26 is arranged to form the data to be transmitted into payload data frames corresponding to time divided units or time frames for transmission. To each of the payload data frames physical layer signalling data is provided by a physical layer data block 28 and added to each of the payload data frames for transmission. That is to say, for each of the channels 20, 22, 24 the audio/video data is formed into a plurality of payload data frames for each of a plurality of time frames corresponding to the plurality of transmission frames generated in the transmitted signal by the transmitter of FIG. 2. The frame may include a time divided section or a frequency divided section having a preamble in which the physical layer signalling is transmitted and one or more data transmission sections which transmit the audio/video data generated by the audio/video sources 20, 22, 24. The data may be interleaved and formed into symbols before being fed into an OFDM modulator 30. The output of the OFDM modulator 30 is passed to a guard insertion unit 32 which inserts a guard interval and the resulting signal is fed to a transmission unit 40 from which it is transmitted by an antenna 42. The guard insertion unit 32 may also be provided with signalling and synchronisation information generated by the signalling and synchronisation generation unit 34. Signalling information which is to be transmitted with a frame synchronisation signal and primary signalling symbols are generated in a signalling information unit 36 and fed to a synchronisation signal generator unit 38. The signalling generator unit 38 generates the frame synchronisation signal and the primary signalling symbols. As will be explained below, signalling information may be represented as a signature sequence which modulates the primary signalling OFDM symbol with respect to a signature sequence of the frame synchronisation OFDM symbol as a relative cyclic shift of the frame synchronisation OFDM symbol in the time domain.

Figure 3:
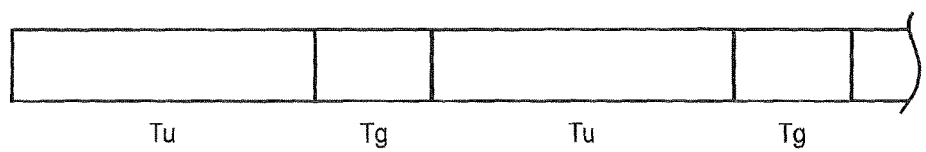
FIG. 3 provides a schematic illustration of OFDM symbols in the time domain which include a guard interval.

As with a conventional arrangement OFDM is arranged to generate symbols in the frequency domain in which data symbols to be transmitted are mapped onto sub carriers which are then converted into the time domain using an inverse Fourier Transform which may comprise part of the OFDM modulator 30. Thus the data to be transmitted is formed in the frequency domain and transmitted in the time domain. As shown in FIG. 3 each time domain symbol is generated with a useful part of duration Tu seconds and a guard interval of duration Tg seconds. The guard interval is generated by copying a part of the useful part of the symbol with duration Tg in the time domain, where the copied part may be from an end portion of the symbol. By correlating the useful part of the time domain symbol with the guard interval, a receiver can be arranged to detect the start of the useful part of the OFDM symbol which can be used to trigger a Fast Fourier Transform to convert the time domain symbol samples into the frequency domain from which the transmitted data can then be recovered. Such a receiver is shown in FIG. 4.

Figure 4:
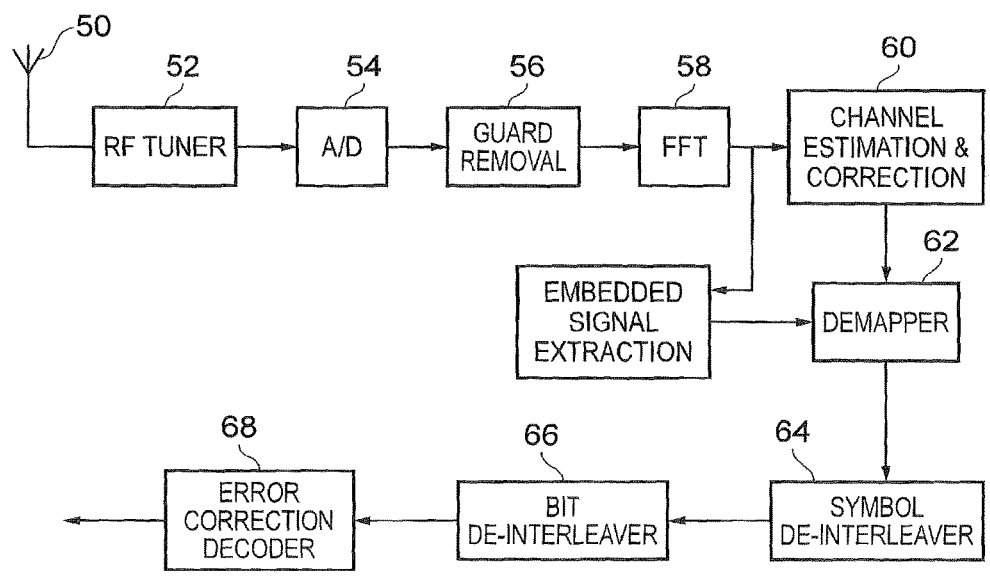
FIG. 4 provides a schematic block of a typical receiver for receiving data broadcast by the broadcast transmission network of FIG. 1 using OFDM.

In FIG. 4 a receiver antenna 50 is arranged to detect an RF signal which is passed via a tuner 52 and converted into a digital signal using an analogue to digital converter 54 before the guard interval is removed by a guard interval removal unit 56. After detecting the optimum position for performing a fast Fourier Transform (FFT) to convert the time domain samples into the frequency domain, an FFT unit 58 transforms the time domain samples to form the frequency domain samples which are fed to a channel estimation and correction unit 60. The channel estimation and correction unit 60 estimates the transmission channel used for equalisation for example by using pilot sub-carriers which have been embedded into the OFDM symbols. After excluding the pilot sub-carriers, all the data-bearing sub-carriers are fed to a de-mapper unit 62 which extracts the data bits from the sub-carriers of the OFDM symbol. These data bits are then fed to a de-interleaver 64 which de-interleaves the sub-carrier symbols. The data bits are now fed to a bit de-interleaver 66, which performs the de-interleaving so that the error correction decoder can correct errors in accordance with an error correction operation for example by using redundant data included in a Forward Error Correction encoding process.

Framing Structure

Figure 5:
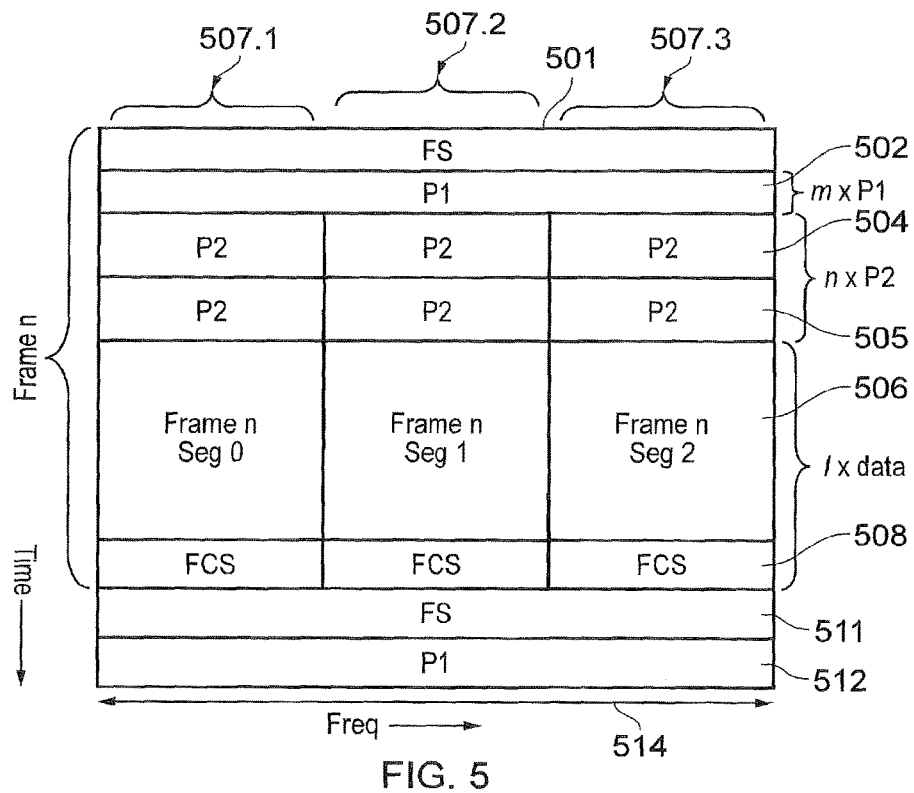
FIG. 5 provides a schematic illustration of a transmission frame for simultaneously transmitting payload data comprising a plurality of services in a plurality of segments separated in the frequency domain in accordance with the present technique.

FIG. 5 shows a schematic diagram of the framing structure of a frame in accordance with an example embodiment of the present technique that may be transmitted and received in the systems described with reference to FIGS. 1 to 4. FIG. 5 illustrates a proposed general structure of transmitted signal to carry data from different channels. For example, this structure can be used for example to carry different television channels in an ISDB-T3 frame. As shown in FIG. 5, the transmission frame is comprised of:

A frame synchronisation OFDM symbol 501 used by the receiver to:
   a. Detect the start of a frame.
   b. Estimate the carrier frequency offset A primary preamble comprised of one or more (m)special OFDM symbols which may be termed primary signalling OFDM symbols 502 (P1) that carry initial signalling information about the structure of the secondary preamble.

A secondary preamble comprised of one or more OFDM symbols which may be termed secondary signalling OFDM symbols 504, 505 (P2) which carry the physical layer (Layer 1) parameters that describe the way the payload is carried in the post-preamble waveform for all the segments of the frame. Appropriate parameters are described in for example DVB standards and the draft ATSC3.0 physical layer standard at the date of filing. In some embodiments the signalling data carried in each one or more secondary signalling OFDM symbol within a frame is identical. In one example, this may be structured in a loop to carry data for each segment. That is to say, each of the different frequency segments 507.1, 507.2, 507.3 of the P2 secondary signalling OFDM symbols 504, 505 provides an instance of band information defining the structure of the payload OFDM symbols 506 for each of the frequency segments 507.1, 507.2, 507.3.

A post-preamble section comprised of a number of payload OFDM symbols 506 which carry the payload and comprise the services formed from the audio/video data generated by the different channels and partitioned into PLPs (Physical Layer Pipe). The number of payload OFDM symbols 506 may be signalled in the secondary signalling OFDM symbols 504, 505. The term Physical Layer Pipe (PLP) is used to identify a channel of audio/video data which may be recovered from the transmission frames.

Each of the channels provided by frequency segments 507.1, 507.2, 507.3 of the payload OFDM symbols is terminated by a frame closure symbols (FCS) 508, before the next frequency synchronisation OFDM symbol 511 and primary (P1) signalling OFDM symbol 512.

In some embodiments, a frame frequency synchronisation OFDM symbol 501, 511 is immediately followed in time by the one or more primary signalling OFDM symbols 502. In some embodiments the last of one or more primary signalling OFDM symbols 502 in a frame is immediately followed in time by one or more secondary signalling OFDM symbols 504, 505. In some embodiments, the last of one or more secondary signalling OFDM symbols 504, 505 in a frame in time is immediately followed by payload OFDM symbols 506.

As mentioned above, the transmission frame is further partitioned into M frequency segments 505.1, 507.2, 507.3 whereby each OFDM symbol of the frame is so partitioned. The number of segments per frame M is configurable and is signalled in the primary signalling OFDM symbols.

The frame synchronisation and primary signalling OFDM symbols are constructed to span the channel bandwidth and so are broadband in nature but can be detected and decoded both by a broadband receiver whose bandwidth spans the full channel or a narrowband receiver whose bandwidth is the same as the bandwidth of one of the M segments. Both the secondary signalling OFDM and payload OFDM symbols are modulated separately per segment and then concatenated in segment order in the frequency domain prior to conversion to the time domain by IDFT. Each secondary signalling OFDM symbol and payload OFDM symbol must therefore be decoded per segment when frequency segmentation is used.

In some embodiments the radio frequency transmission bandwidth 514 of the transmitted signal of FIG. 5 represents a bandwidth for the frame of approximately 6 Mhz or approximately 8 Mhz. However it will be appreciated that these are just examples and other radio frequency transmission bandwidths may be used so that embodiments of the present disclosure are not limited to these bandwidths.

The following paragraphs describe how a frame synchronisation OFDM symbol may be constructed at a transmitter and detected at a receiver, in addition to how primary signalling OFDM symbols may be constructed, how they may carry signalling information and how the information they carry may be decoded at the receiver.

Synchronisation Signals

Figure 6:
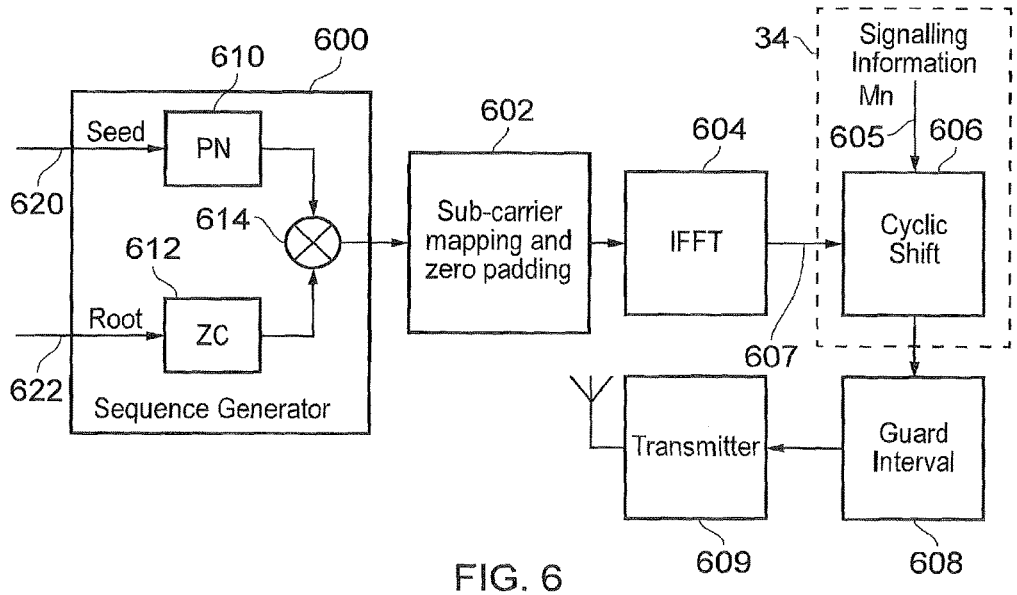
FIG. 6 provides a schematic block diagram of a part of the transmitter shown in FIG. 2 for transmitting a frame synchronisation OFDM symbol in accordance with the present technique.

A schematic block diagram of a part of the transmitter shown in FIG. 2 which is configured to transmit a frame synchronisation signal is shown in FIG. 6. In FIG. 6 a signature sequence generator 600 is arranged to generate a signature sequence which is mapped onto the sub carriers of an OFDM symbol forming the frame synchronisation OFDM symbol by the sub carrier mapping and zero padding unit 602. The frequency domain signal is then transformed into the time domain by an inverse Fourier transform 604. Signalling information which is to be transmitted with the frame synchronisation signal is fed on a first input 605 to a cyclic shift unit 606. The cyclic shift unit 606 also receives on a second input 607 the time domain OFDM symbol representing the frame synchronisation OFDM symbol. In embodiments of the present technique, operation of the cyclic shift unit 606 in combination with its respective inputs may be equivalent to that of the signalling and synchronisation generation unit 34 of FIG. 2. As will be explained below, signalling information is represented as a signature sequence which modulates primary signalling OFDM symbol with respect to a signature sequence carried by the frame synchronisation OFDM symbol as a relative cyclic shift of the frame synchronisation OFDM symbol in the time domain. The primary signalling OFDM symbol are then fed to a guard interval insertion unit 608, which adds a guard interval to the frame synchronisation OFDM symbol in the form in which the OFDM symbol forming of the frame synchronisation OFDM symbol will be transmitted by a transmitter unit 609.

The frame synchronisation OFDM symbol has a similar structure to the first ATSC 3.0 bootstrap symbol as described in A/321 [2]. The frame synchronisation OFDM symbol is a 2048p FFT size OFDM symbol. The value of p can be any of {0.25, 0.5, 1, 2, 4} thereby making the frame synchronisation OFDM symbol an OFDM symbol of {512, 1K, 2K, 4K, 8K} FFT size, respectively.

As shown in FIG. 6 the signature sequence generator 600 comprises a pseudo random sequence generator 610 and a Zadoff-Chu sequence generator 612 which are used to generate a signature sequence. These two sequences are multiplied together by a multiplier 614 before the combined sequences are mapped onto the sub carriers of the OFDM symbol by the sub carrier mapping and zero padding unit 602. As shown in FIG. 6 the seed value for the pseudo random number generator 610 is fed on a first input 620 and a second input 622 provides an indication of the root of the Zadoff-Chu (ZC) sequence generator 612. The ZC sequence is generated using the equation $$z_q(k) = e^{\frac{-j\pi q k(k+1)}{N_a}}$$

where q is defined as the root of the ZC sequence.

Figure 7:
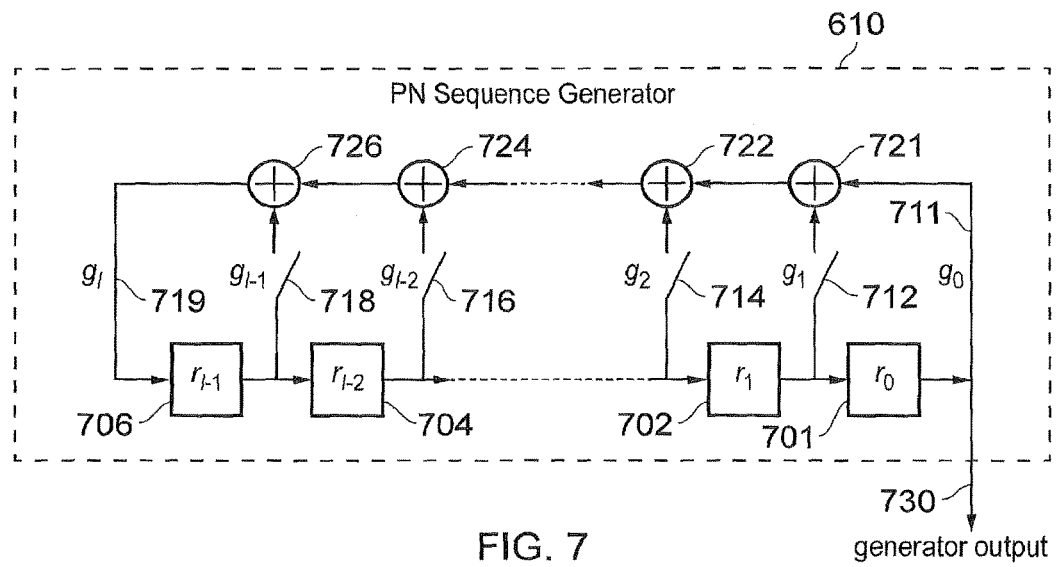
FIG. 7 provides a schematic diagram of a pseudo-noise sequence generation circuit used in the generation of the frame synchronisation OFDM symbol in accordance with the present technique.

As described with reference to FIG. 6, the frame synchronisation OFDM symbol is constructed in the frequency domain by mapping to its sub-carriers the coefficients of the Zadoff-Chou (ZC) sequence multiplied with bipolar coefficients that are generated from a pseudo-noise (PN) sequence generator as illustrated in FIG. 7. In embodiments of the combined sequence is therefore described as a (ZC*PN) sequence FIG. 7 provides a schematic diagram of a pseudo-noise generation circuit 610 forming part of the signature sequence generator 600 as illustrated in FIG. 6 and which is used in the generation of the frame synchronisation OFDM symbol in accordance with the present technique. The PN sequence is generated using the polynomial $$p(x)=x^{16}+x^{15}+x^{14}+x+1$$

and using a generation circuit as illustrated in FIG. 7. At the start of each frame, a chosen 16-bit seed g is used to initialise each of the elements $r_1$ 701, 702, 704, 706. This seed takes the form of $$g=\{g_{16}, \ldots, g_0\}=\{1,1,1,0,0,0,0,0,0,0,0,0,0,0,1,1\}$$

where each bit $g_i$ 711, 712, 714, 716, 718, 719 has a binary value of either 0 or 1. These are combined by the plurality of addition elements 721, 722, 724, 726 in order to form the 16-bit seed g.

Figure 8:
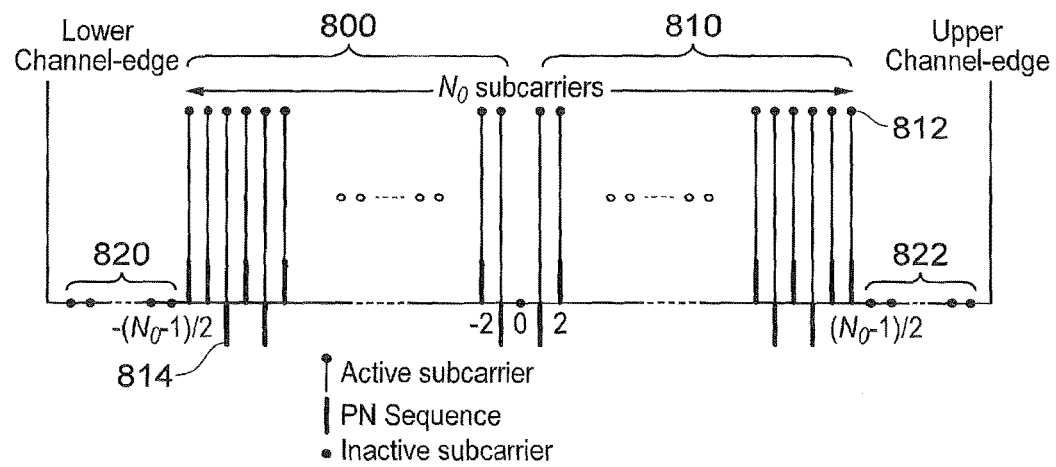
FIG. 8 provides a schematic representation of a frame synchronisation OFDM symbol in the frequency domain in accordance with the present technique.

The mapping of (ZC*PN) sequence to form the signature sequence onto the OFDM symbol in a symmetrical way is shown in FIG. 8.

As shown in FIG. 8, in the frequency domain, the frame synchronisation signal can be regarded as comprising two halves 810 of a symmetrical Zadoff-Chu (ZC) sequence. Each symbol in the Zadoff-Chu sequence is arranged to modulate an active carrier 812. Correspondingly the PN sequence is arranged to modulate the sub-carriers as shown by the lines 814. Other sub carriers of the frame synchronisation signal are not used and so are set to zero as shown for example at either end of the frame synchronisation signal 820, 822.

The length of the (ZC*PN) sequence $N_a$ is a configurable parameter called the number of useful subcarriers per frame synchronisation OFDM symbol. This means that the (ZC*PN) coefficients are mapped only to the central $N_a$ sub-carriers of the frame synchronisation OFDM symbol whilst the other sub-carriers (at the low and high-band edge of the symbol) are set to zero. The (ZC*PN) sequence has mirror symmetry in its construction with the central coefficient set to zero.

As shown in FIG. 8 the ZC sequence and the PN sequence are mapped to the OFDM sub-carriers in a manner that produces a reflective symmetry about the central DC sub carrier of the OFDM symbol. The subcarrier values for the n-th symbol of the frame synchronisation ($0 \leq n < N_B$) may be calculated as in the following equation, where $N_H=(N_{ZC}-1)/2$, $N_B$ is the number of symbols and p(k) are elements of the PN-sequence. The ZC sequence is determined by its root q, which may be the same for each symbol, while the PN sequence shall advance with each symbol.

$$s_n(k) = \begin{cases} z_q(k+N_H) \times c((n+1) \times N_H + k) & -N_H \leq k \leq -1 \\ z_q(k+N_H) \times c((n+1) \times N_H - k) & 1 \leq k \leq N_H \\ 0 & \text{otherwise} \end{cases}$$

$c(k) = 1 - 2 \times p(k)$ with $c(k)$ having either the value $+1$ or $-1$.

The final symbol is inverted in phase (i.e. a rotation of 180°) of the subcarrier values for that particular symbol. This provides an indication of the definite end of the frame synchronisation and preamble signal. This is provided in case there are further symbols, in which case a receiver is provided with a definite indication of the last OFDM symbol. That is to say any number of synchronisation and signalling OFDM symbols may be used. Accordingly, receivers can detect the phase inversion and so detect the end of the frame synchronisation signal $$\tilde{s}_n(k) = \begin{cases} s_n(k) & 0 \leq n < N_B - 1 \\ -s_n(k) & n = N_B - 1 \end{cases}$$

In one example, signalling data can be conveyed in the primary signalling symbols by performing a data-determined cyclic shift of the frame synchronisation OFDM symbol in the time domain. This is performed by the cyclic shift blocks shown in FIG. 6. The process for conveying signalling bits is summarised in FIG. 9.

Figure 9:
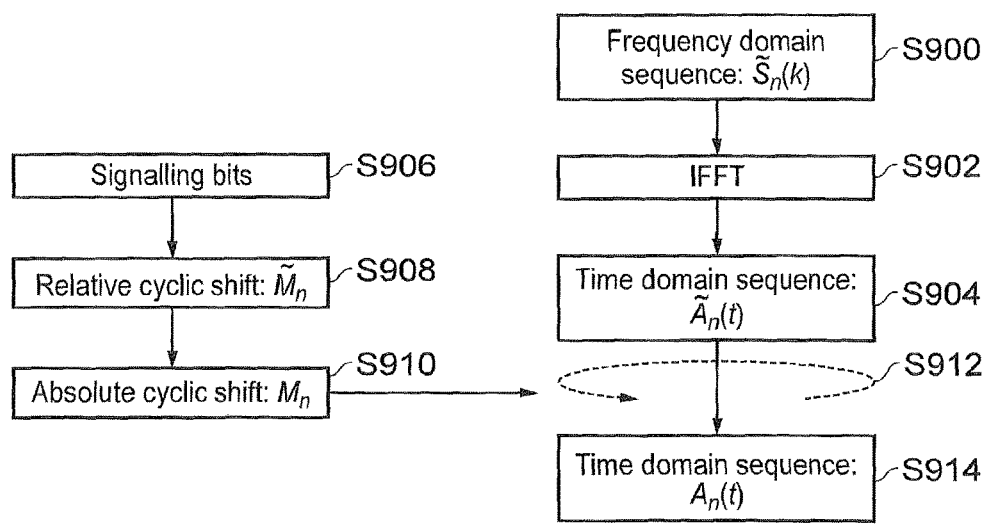
FIG. 9 is an illustrative flow diagram representing an example operation of a transmitter in generating one or more of the frame synchronisation OFDM symbols by cyclically shifting a time domain symbol sequence in accordance with the present technique.

In FIG. 9 the frequency domain sequence is formed by the sequence generator 700 in the frequency domain in step S900. In step S902 an inverse Fourier transform is performed by the IFFT module 704 to convert the frequency domain signal into the time domain. Thus, in step S904, the sequence is formed in the time domain. As shown in step S906 the signalling bits are formed and then interpreted in step S908 as a relative cyclic shift value and in step S910 the relative shift value is converted to an absolute shift value. As shown by arrow S912 the time domain sequence formed in step S904 is then shifted in accordance with the absolute cyclic shift determined in step S910. Finally, in step S914 the time domain sequence to be transmitted is produced.

Time Domain Structure

Figure 10:
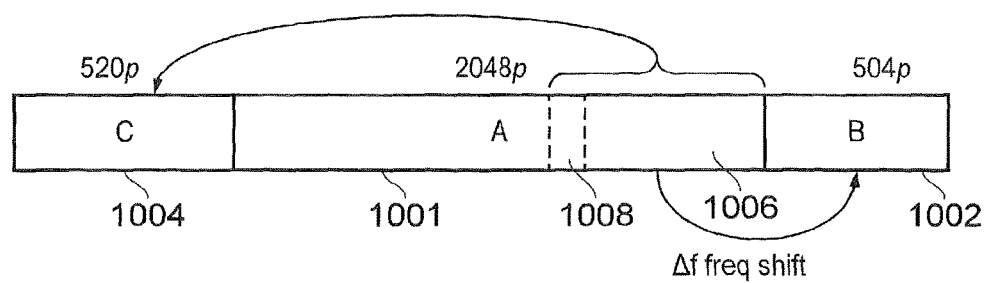
FIG. 10 provides a schematic representation of a time domain structure of a frame synchronisation OFDM symbol in accordance with the present technique.
Figure 11:
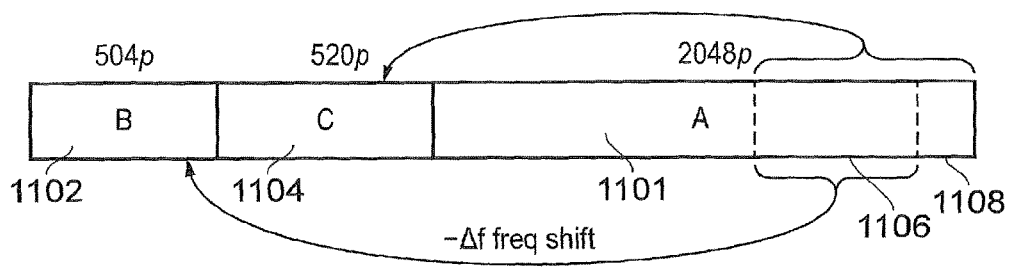
FIG. 11 provides a schematic representation of a second time domain structure of a primary signalling OFDM symbol in accordance with the present technique.

In one example, each of the frame synchronisation OFDM symbols is formed by the transmitter from three parts which are referred to as A, B and C. As explained above, an OFDM symbol is usually formed with a guard interval generated by copying a section of the OFDM symbol in the time domain as a preamble to the OFDM symbol in order to account for multi path reception at the receiver. Each frame synchronisation OFDM symbol is formed in one of two ways. The different formation of the frame synchronisation OFDM symbols and primary signalling symbols in the time domain is shown in FIGS. 10 and 11. As shown in both FIGS. 10 and 11 the data carrying part of the symbol that is the original formation of the OFDM symbol before guard intervals are added is represented as section A 1001, 1101. Thus, section A 1001, 1101 is derived as the 2048p-point IFFT of the frequency domain structure with or without the cyclic shift explained above to represent the signalling bits being conveyed by the frame synchronisation OFDM symbol, where part A 1001, 1101 is the useful part of the symbol made up of the 2048p samples from the IFFT. Parts B 1002, 1102 and C 1004, 1104 are composed of samples taken from the end of A 1001, 1101 with a frequency shift of $\pm f_{66}$ which is equal to the sub carrier spacing introduced into the samples of B 1002, 1102 by the transmitter, and correspondingly removed at the receiver. Each frame synchronisation OFDM symbol and primary signalling symbol consistently consists of 3072p samples, where A 1001, 1101 consists of 2048p samples, C 1004, 1104 consists of the last 520p samples 1006 and 1008, 1106 and 1108 of A 1001, 1101, and B 1002, 1102 consists of the last 504p samples 1006, 1106 of C 1004, 1104 with the frequency shift of $\pm f_\Delta$ applied.

The frame synchronisation OFDM symbol is provided for synchronisation detection of the particular (ZC*PN) sequence it carriers, and employs a C-A-B structure as shown in FIG. 10 and applies a frequency shift of $+f_\Delta$ to part B 1002. The choice of (ZC*PN) call be used for signalling such things as the major and minor versions of the standard in use, alert status that can be used to provide an emergency warning state, transmitter identification or transmitter location etc.

The one or more primary signalling symbols carry signalling information and use a B-C-A structure as shown in FIG. 11 including the final symbol with a phase inversion which provides the termination of the preamble signal as explained above and applies a frequency shift of $-f_A$ to part B 1102.

As described in [2], information shall be signalled via the primary signalling OFDM symbols through the use of cyclic shifts in the time domain of the $\tilde{A}_n(t)$ time domain sequence. This sequence has a length of $N_{FFT}=2048p$ and thus 2048p distinct cyclic shifts are possible (from 0 to 2047p, inclusive).

With 2048p possible cyclic shifts, up to $\log_2(2048p)$ bits can be signaled. In reality, not all of these bits will actually be used. Let $N_b{}^n$ specify the number of valid signalling bits that are used for the n-th primary signalling OFDM symbol ($1 \leq n < N_S$), and let $$b_0^n, \ldots, b_{N_b^n-1}^n$$

represent the values of those bits. Each of the valid signalling bits $$b_0^n, \ldots, b_{N_b^n-1}^n$$

shall have the value 0 or 1. Each of the remaining signalling bits $$b_{N_b^n}^n, \ldots, b_{10}^n$$

shall be set to 0.

$N_b{}^n$ for one or more specific primary signalling OFDM symbols may be increased up to $\log_2(2048p)$ when depending on p. Table I below shows the maximum possible number of bits $N_p{}^n = \log_2(2048p)$ for each primary signalling OFDM symbol for the set of values for p.

TABLE I

Maximum number of bits that can be signalled per FFT size.

| P | FFT Size | $N_p{}^n$ |
|---|---|---|
| 0.25 | 512 | 9 |
| 0.5 | 1024 | 10 |
| 1 | 2048 | 11 |
| 2 | 4096 | 12 |
| 4 | 8192 | 13 |

Let $\tilde{M}_n$ ($0 \leq \tilde{M}_n < N_{FFT}$) represent the cyclic shift for the n-th primary signalling OFDM symbol ($1 \leq n < N_S$) relative to the cyclic shift for the previous symbol. $\tilde{M}_n$ shall be calculated from the valid signalling bit values for the n-th primary signalling OFDM symbol using a Gray code created per the following equations. Let $\tilde{M}_n$ be represented in binary form as a set of bits $m_{N_p^n-1}{}^n \ldots m_9{}^n \ldots m_1{}^n m_0{}^n$. Each bit of $\tilde{M}_n$ shall be computed as follows, where the summation of the signalling bits followed by the modulo-two operation effectively performs a logical exclusive OR operation on the signalling bits in question.

$$m_i^n = \begin{cases} \left(\sum_{k=0}^{N_p^n-1-i} b_k^n\right) \bmod 2 & i > N_p^n - 1 - N_b^n \\ 1 & i = N_p^n - 1 - N_b^n \\ 0 & i < N_p^n - 1 - N_b^n \end{cases}$$

The above equation ensures that the relative cyclic shift $\tilde{M}_n$ is calculated to provide the maximum tolerance to any errors at the receiver when estimating the relative cyclic shift for a received primary signalling OFDM symbol. If the number of valid signalling bits $N_b{}^n$ for a specific primary signalling OFDM symbol is increased in a future minor version within the same major version, the equation also ensures that the relative cyclic shifts for that future minor version primary signalling OFDM symbol will be calculated in such a manner that this will still allow a receiver provisioned for an earlier minor version to correctly decode the signalling bit values that it is provisioned to decode, and hence backward compatibility will be maintained. In general, the expected robustness of signalling bit $b_i{}^n$ will be greater than that of $b_k{}^n$ if i<k.

The frame synchronisation OFDM symbol shall be used for initial time synchronization may also signal other aspects of the system via the choice of the ZC root and/or PN seed parameters. This symbol does not signal any additional information and shall always have a cyclic shift of 0.

The differentially-encoded absolute cyclic shift, $M_n$ ($0 \leq M_n < N_{FFT}$), applied to the n-th primary signalling OFDM symbol shall be calculated by summing the absolute cyclic shift for symbol n−1 and the relative cyclic shift for symbol n, modulo the length of the time domain sequence.

$$M_n = \begin{cases} 0 & n = 0 \\ (M_{n-1} + \tilde{M}_n) \bmod N_{FFT} & 1 \leq n < N_S \end{cases}$$

The absolute cyclic shift shall then be applied to obtain the shifted time domain sequence from the output of the IFFT operation.

$$A_n(t) = \tilde{A}_n((t + M_n) \bmod N_{FFT})$$

In summary therefore, signalling parameters to be transmitted in primary signalling OFDM symbol n are formed into an $N_b{}^n$-bit value. The bits are Grey encoded to derive an 11-bit value $\tilde{M}_n$ which is added to the 11-bit value transmitted in primary signalling OFDM symbol (n−1) modulo $N_{FFT}$. For these purposes, the value transmitted in the frame synchronisation (n=0) symbol is considered as zero. This new value $M_n$ represents the relative cyclic shift that would be applied to primary signalling OFDM symbol n.

Frame Synchronisation at the Receiver: Broadband

The receiver has to detect the presence of a frame synchronisation OFDM symbol as a marker for the start of a frame. The receiver would be preconfigured with the right values for p, $N_a$ and $\Delta f$. The frame synchronisation OFDM symbol can be detected in the time domain but further processing for example to find any carrier frequency offsets, and/or to confirm which (ZC*PN) sequence has been used must be done in the frequency domain. First though, the frame synchronisation OFDM symbol detection is equivalent to detection of the frame start.

Figure 12:
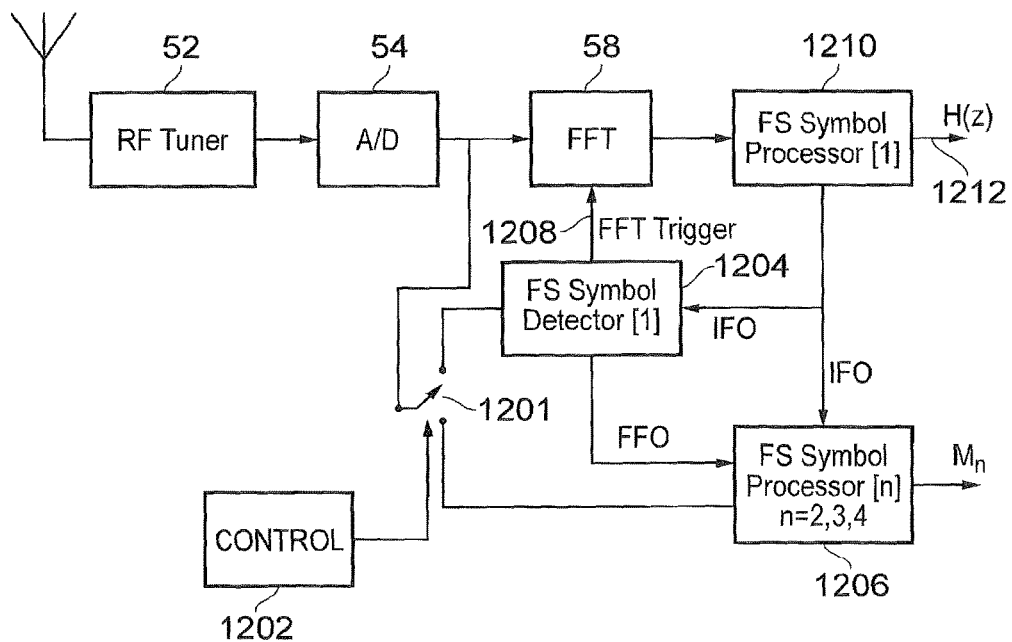
FIG. 12 is a schematic block diagram of an example receiver for detecting and recovering signalling from the one or more frame synchronisation OFDM symbols in accordance with the present technique.

A schematic block diagram illustrating an adaptation of the receiver shown in FIG. 4 when operating to detect the presence of a frame synchronisation OFDM symbol is shown in FIG. 12. As shown in FIG. 4 the signal detected by an antenna 50 is fed to an RF tuner 52 and then to an A to D converter 54. The received digitally sampled signal is then fed to a Forward Fourier Transform processor 58 and also to a first input of a switch 1201, which is controlled by a controller 1202 to switch the received digitally sampled signal between a frame synchronisation detector 1204 and a second of two frame synchronisation processors 1206, 1210. The frame synchronisation detector 1204 generates a trigger signal fed on a channel 1208 to the FFT processor 58 in order to identify a most useful part of the received signal which is to be converted from the time to the frequency domain to validate the frame synchronisation signal and to recover the signalling data. An output of the FFT processor 58 provides a frequency domain version of the received signal to a first of the frame synchronisation processors 1210. The first frame synchronisation processor 1210 is configured to generate a first estimate of the channel transfer function (CTF) H(z) at an output channel 1212.

Figure 13:
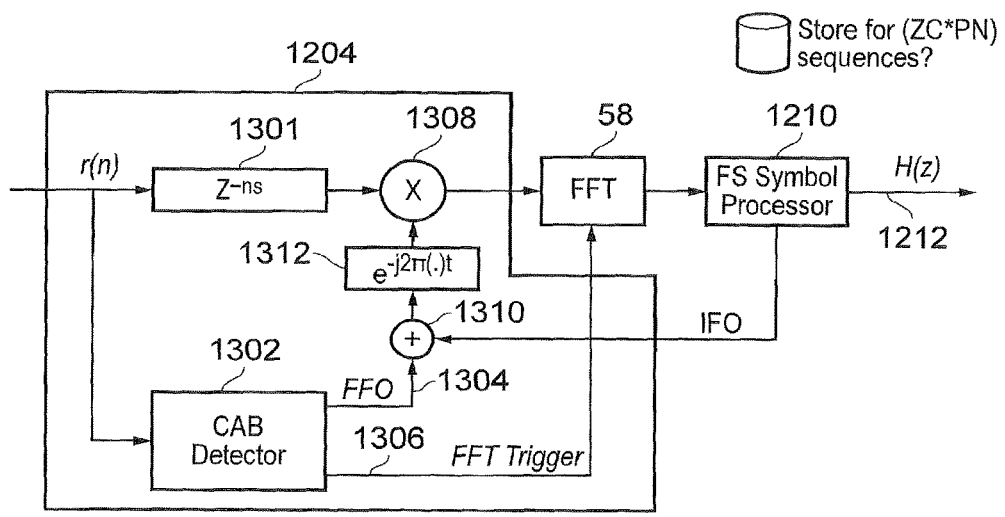
FIG. 13 is a schematic block diagram of a receiver for detecting a frame synchronisation OFDM symbol including identifying a trigger time for performing a forward Fourier transform on an OFDM symbol in accordance with the present technique.

An example detector of the frame synchronisation OFDM symbols of the preamble signal is provided in FIG. 13. As indicated above only first frame synchronisation OFDM symbol has the C-A-B structure which is transmitted to provide initial synchronisation. FIG. 13 provides an example block diagram of a detector for the frame synchronisation OFDM symbol. As shown in FIG. 13 the received discrete time signal r(n) is fed to a delay unit 1301 and a C-A-B structure detector 1302. The C-A-B structure detector 1302 generates on a first output 1304 an estimate of a fine frequency offset (FFO), which is a frequency shift smaller than the OFDM symbol sub-carrier spacing and which may have occurred during the transmission of the frame synchronisation OFDM symbol. Also output from a second channel 1306 is an indication of a timing trigger for indicating the period of the received OFDM symbol which is transformed by the FFT processor 58, so as to capture as far as possible a maximum amount of energy of the received OFDM frame synchronisation OFDM symbol. However before transforming the received frame synchronisation OFDM symbol into the frequency domain, a total frequency offset is removed by a multiplier 1308. The multiplier 1308 receives on a first input the delayed received signal from the delay unit 1301 and on a second input an inverse of a total frequency offset which is formed by an adder 1310 and a tone generator 1312. The total frequency offset is formed by the adder 1310 from one or both of the fine frequency offset (FFO) estimated by the C-A-B detector 1302 which is fed to a first input and an integer frequency offset (IFO) estimated by the frame synchronisation signal processor 1310. This total frequency offset is input into the tone generator 1310 causing it to generate a sinusoidal tone at a frequency equal to the total frequency offset. The frame synchronisation signal processor 1210 generates the IFO by correlating the frequency domain sub-carriers with a re-generated version of the signature sequence generated from a combination of the ZC sequence modulated with the PN sequence. The location of a peak of the correlation output is then used to estimate the IFO, which is a displacement in the frequency domain of a number of sub-carriers with respect to a frequency reference within the frequency band of the frame synchronisation signal. Thus the total frequency offset is estimated and removed by the multiplier 1308 and the tone generator 1210 from the FFO estimated by the CAB structure detector 1302 and the IFO estimated by the frame synchronisation signal processor 1210.

As indicated above the detector 1302 shown in FIG. 13 for detecting the frame synchronisation OFDM symbol is used to generate a FFO and indicate the useful part of the input signal burst for Forward Fourier Transform (FFT).

Figure 14:
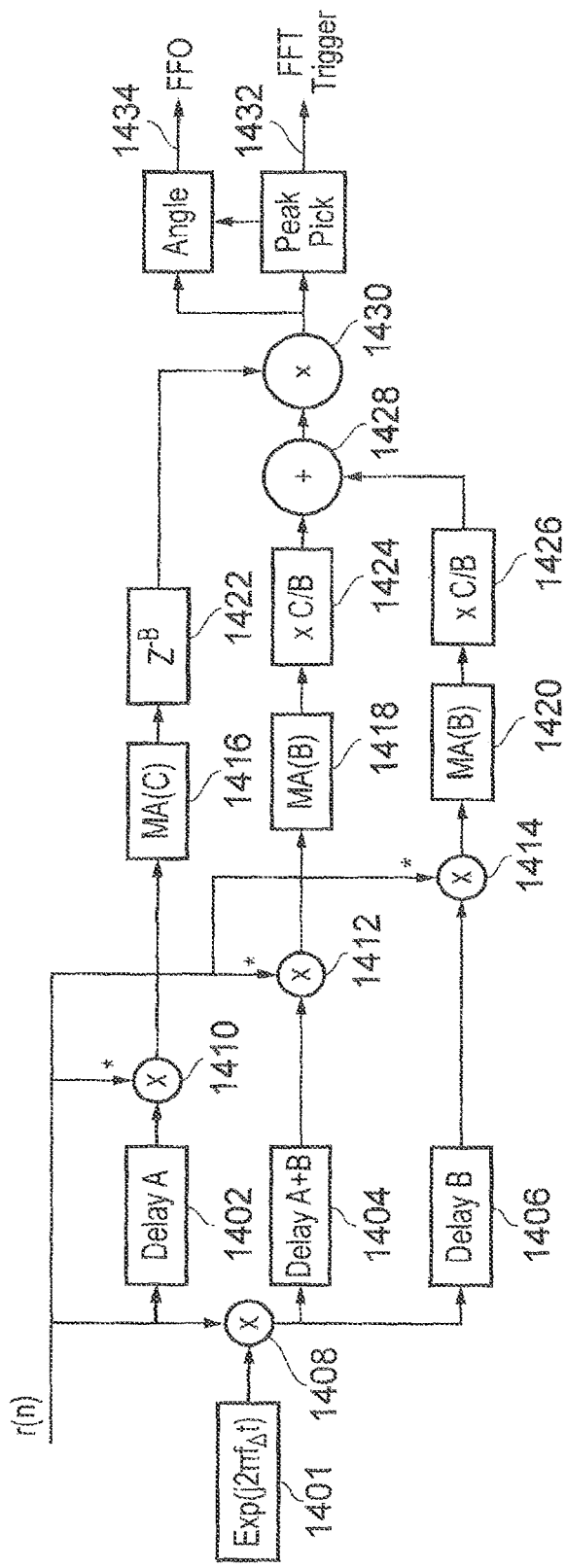
FIG. 14 is a schematic block diagram representation of a correlator configured to detect the frame synchronisation OFDM symbol in accordance with the present technique.

FIG. 14 is a schematic block diagram representation of a correlator configured to detect the frame synchronisation OFDM symbol in accordance with the present technique. This detection indicates the start of the A-part of the frame synchronisation OFDM symbol on which an FFT can be performed. The rest of the process comprises detection of the (ZC*PN) sequence used on the frame synchronisation OFDM symbol followed by decoding of the signalling parameters carried in the following primary signalling OFDM symbols. Each of the following primary signalling OFDM symbols uses the same ZC sequence as the frame synchronisation OFDM symbol and a known segment of the PN-sequence. The first stage is therefore to detect which ZC (root of sequence) and PN (seed of sequence) sequences were used.

As shown in FIG. 14, the received discrete time signal r(n) is fed to a delay unit 1402 and into a multiplier 1408, where it is frequency shifted corresponding to the frequency adjustment $e^{j2\pi fT}$ of a tone generator 1401. The output of the multiplier 1408 is fed into two further delay units 1404 and 1406 which serve to delay the received signal by a number of samples respectively equal to the number in the A, A_B and B parts of the frame synchronisation OFDM symbol. Each delay unit output is passed into further multipliers 1410, 1412, and 1414, where they are multiplied by the complex conjugate of the received discrete time signal r(n), and fed into moving average filters 1416, 1418 and 1420, to form a correlation of the received signal with respect t itself following the delay A, A+B and B. The outputs of the moving average filters 1416, 1418, 1420 are delayed by delay element 1422 and up-scaled by scaling elements 1424, 1426 respectively, wherein the outputs of the two scaling elements 1424 and 1426 are summed by an adder 1428. The output of this adder is then multiplied with the output of the delay element 1422 by multiplier 1430 to generate a peak combined sample by correlating each of the sections C, A and B of the received signal with their respective copies to identify a peak at which the FFT trigger point is detected at the output 1432. Correspondingly, the phase of the peak determines the FFO provided on the output 1434.

The used (ZC*PN) sequence is mapped to the sub-carriers of the frame synchronisation OFDM symbol. For ATSC 3.0, the used sequence shall be formed by a multiplying:

A ZC sequence with root q=137 and

A PN sequence with generator seed being one of those taken from Table II below.

TABLE II

Possible seeds for PN sequence generator
$r_{init} = \{r_{L-1}, \ldots, r_0\}$

| Seed number | Binary | Hexadecimal |
| --- | --- | --- |
| 0 | 0000 0001 1001 1101 | 0x019D |
| 1 | 0000 0000 1110 1101 | 0x00ED |
| 2 | 0000 0001 1110 1000 | 0x01E8 |
| 3 | 0000 0000 1110 1000 | 0x00E8 |
| 4 | 0000 0000 1111 1011 | 0x00FB |
| 5 | 0000 0000 0010 0001 | 0x0021 |
| 6 | 0000 0000 0101 0100 | 0x0054 |
| 7 | 0000 0000 1110 1100 | 0x00EC |

It is possible to define and use other PN sequence seeds and potentially another generator polynomial. It therefore follows that for ATSC 3.0, there are a possible 8 (ZC*PN) sequences that the transmitter can use. In embodiments of the present technique, all the 8 sequences are pre-generated and stored at the receiver. When trying to detect which of the 8 sequences was used, the receiver can correlate each of the stored sequences with the FFT result of the A-part of the frame synchronisation OFDM symbol in turn. The sequence which provides the highest peak correlation is the (ZC*PN) sequence used at the transmitter. The frequency offset is the relative bin location of this peak correlation ranging between $-F_{max}$ and $F_{max}$ where $F_{max}$ is the maximum target integer frequency offset in FFT bins.

Figure 15:
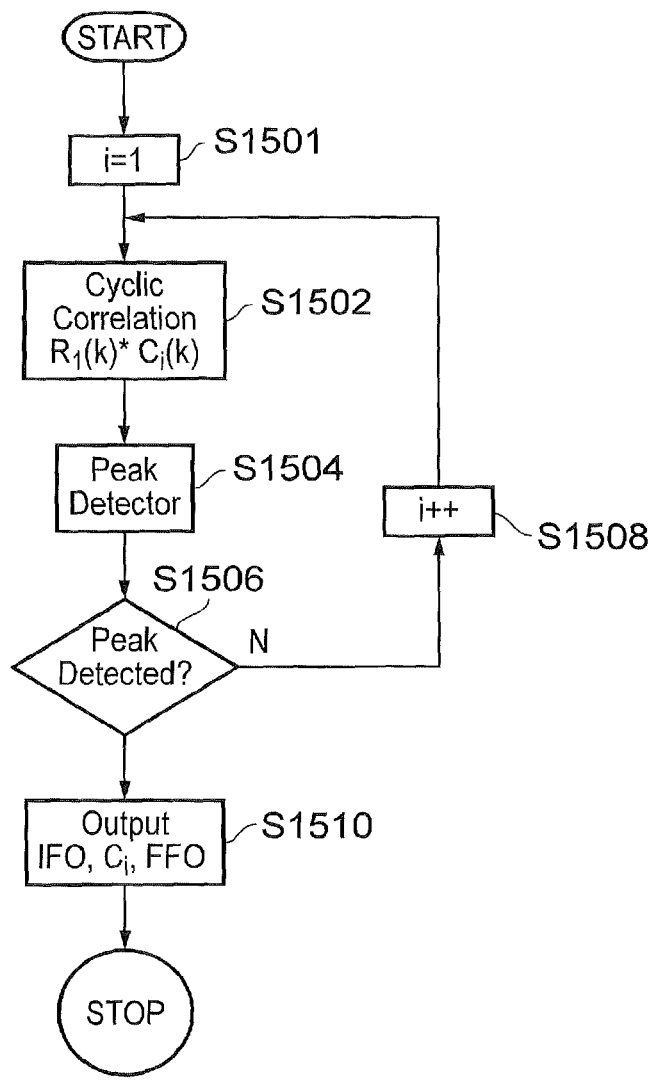
FIG. 15 is a flow diagram illustrating the detection at a receiver of a used sequence and frequency offsets in the generation of the frame synchronisation OFDM symbols and the primary signalling OFDM symbols in accordance with the present technique.

A flow graph for this procedure is shown in FIG. 15 in which $R_1(k)$ is the FFT of the frame synchronisation OFDM symbol and $C_i(k)$ is the i-th (ZC*PN) sequence. With the integer frequency offset and (ZC*PN) sequence detected, the receiver can proceed after frequency offset correction to decoding of the primary signalling OFDM symbols.

The diagram shown in FIG. 15 may be summarised as follows:

START: At the start of the process the received symbol is in the frequency domain as shown in FIG. 15. In some embodiments, the symbol spectrum may be oversampled having been derived from an FFT of larger than 2048p spectral output components.

S1501: At the start of the loop the reference signature sequence index variable is initialised as i=1.

S1502: A cyclic correlation is therefore performed between the received frequency domain OFDM symbol and the i-th signature sequence.

S1504 and S1506: A significant peak value will be detected in the output of the cross correlation within the range of IFO if the reference signature sequence i is the same as the one used at the transmitter. If significant peak value has not been detected then processing proceeds to step S1508 and the reference signature sequence index variable i increased and the next reference signature sequence is tried in the cross-correlation. The candidate reference signature sequences may be pre-stored in the receiver with the indexing based a combination of the root of the Zadoff-Chu and the seed of the PN generator used to generate the particular sequence.

S1510: If a significant peak of the cross-correlation has been detected, then the current value of i is the index to the wanted reference signature sequence; the relative position of the peak in the cross-correlation output is used to determine the Integer Frequency Offset (IFO) and the Fine Frequency Offset (FFO) if the spectrum was over-sampled.

At STOP the process ends.

Detecting Primary Signalling Data

Signalling is carried in each of the primary signalling OFDM symbols. The signalling parameters are encoded as relative cyclic shifts on the A-part of the primary signalling OFDM symbol. The relative cyclic shifts are also differentially encoded from symbol to symbol. A decoding process can in one example detect the relative cyclic shift on the given symbol and then differentially decode this with the previous symbol's cyclic shift. In one example, the differential cyclic shift is determined as part of the decoding process itself. This has the advantage that explicit channel estimation and correction which are rather computationally intensive can be avoided.

Let $R_n(k), H_n(k), P_n(k), Z_n(k)$ be respectively the received spectrum sequence, the channel transfer function, the used PN sequence and the used ZC sequence for the n-th symbol where k is the sub-carrier index. Further, let $M_{n-1}$ be the absolute cyclic shift on symbol n−1 whilst the incremental cyclic shift relative to symbol n−1 that encodes the signalling parameter carried in symbol n be m. Then for primary signalling OFDM symbols n−1 and n and recalling that for a given frame, $$Z(k)=Z_{n-1}(k)=Z_n(k)$$

i.e the same ZC sequence is used for the frame synchronisation OFDM symbol and all primary preamble symbols of a given frame, and designating the noise in symbol n as $N_n(k)$, it can be written:

$$R_{n-1}(k)=H_{n-1}(k).Z(k).P_{n-1}(k).e^{-j2\pi k M_{n-1}/N_{FFT}}+N_{n-1}(k)$$

$$R_n(k)=H_n(k).Z(k).P_n(k).e^{-j2\pi(M_{n-1}+m)k/N_{FFT}}+N_n(k)$$

Recall that for n−1=0, $M_{n-1}$=0 i.e. there is no cyclic shift on the frame synchronisation OFDM symbol of the frame. The decoding algorithm entails dividing $R_n(k)$ by $R_{n-1}(k)$ and finding the phase slope of the residual signal that represents the relative m-sample cyclic shift between the two symbols. It is therefore possible to execute:

$$\frac{R_n(k)}{R_{n-1}(k)}=\frac{H_n(k)\cdot Z(k)\cdot P_n(k)\cdot e^{-j2\pi(M_{n-1}+m)k/N_{FFT}}+N_n(k)}{H_{n-1}(k)\cdot Z(k)\cdot P_{n-1}(k)e^{-j2\pi k M_{n-1}/N_{FFT}}+N_{n-1}(k)}$$

Given the short duration of each frame synchronisation OFDM symbol or primary preamble symbol, it is reasonable to assume that for a given centre frequency $f_0$ and relative receiver speed of $v=c/f_0$, where c is the speed of light, the channel will effectively remain constant between the two consecutive symbols i.e.

$$H(k)=H_{n-1}(k)=H_n(k)$$

As an example, for $f_0$=690 MHz which is at the top range of the UHF band used for TV, v has to exceed about 1564 km/h for the channel to change significantly between symbols.

In the above equation, the noise becomes multiplicative thereby resulting in an intractable analysis and poor performance. Nevertheless, since the relative cyclic shift desired to be decoded is in the phase slope, the amplitudes of any of the component results of the above equation are not particularly important. It is therefore possible to change the division by $R_{n-1}(k)$ to a multiplication by its conjugate. This avoids the intractable maths and produces a result in which all the noise is additive to the main phase signal. As far as the phase slope is concerned, the result from dividing is equivalent to that from multiplying with the conjugate:

$$\frac{R_n(k)}{R_{n-1}(k)} \cong R_n(k)R_{n-1}^*(k)$$

Therefore, ignoring the index k, the left hand side can be expanded as follows:

$$R_nR_{n-1}^*=(H.Z.P_n.e^{-j2\pi(M_{n-1}+m)/N_{FFT}}+N_n)^*(H.Z.P_{n-1}.e^{-j2\pi M_{n-1}/N_{FFT}}+N_{n-1})^*$$

Expanding:

$$R_nR_{n-1}^*=P_nP_{n-1}.e^{-j2\pi m/N_{FFT}}+H.Z.P_n.e^{-j\beta}.N_{n-1}^*+H^*.Z^*.P_{n-1}e^{j\alpha}.N_n+N_nN_{n-1}^*$$

where $\beta=2\pi(M_{n-1}+m)/N_{FFT}$ and $\alpha=2\pi M_{n-1}/N_{FFT}$. Divide with $P_n$ and $P_{n-1}$ (or multiply with—since both are bipolar)

$$R_nR_{n-1}^*=e^{-j2\pi m/N_{FFT}}+H.Z.P_{n-1}.e^{-j\beta}.N_{n-1}^*+H^*.Z^*.P_ne^{j\alpha}.N_n+P_{n-1}.P_nN_nN_{n-1}^*$$

The second and third terms of the right-hand side are modulated noise whilst the last term is just plain white noise—recall that $P_n$ and $P_{n-1}$ are bipolar sequences. As all the noise is additive, the combined power of these terms depends on the SNR of the received signal. It can therefore be expected that at reasonable levels of SNR, the argument or phase trajectory of the result would be dominated by the first term on the right. Thus by detecting the phase slope of the result, it is possible to detect m, the relative cyclic shift between the two symbols. Further, the cyclic shift can also be detected by carrying out an IFFT on the result and taking the sample location of the peak amplitude since:

$$\text{IFFT}(e^{-j2\pi mk/N_{FFT}}) = \text{FFT}(e^{j2\pi mk/N_{FFT}})/N_{FFT}$$

Figure 16:
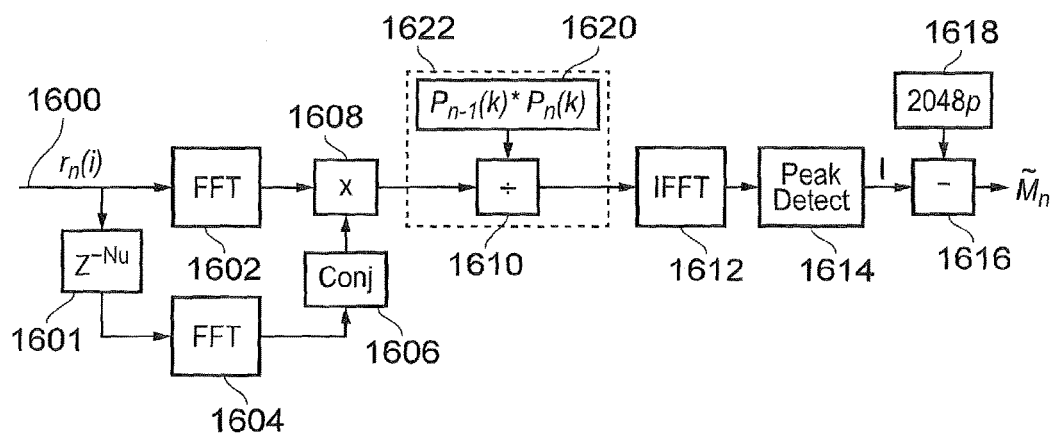
FIG. 16 is a schematic block diagram representation of a first method of frequency domain decoding of relative cyclic shift at a receiver in accordance with the present technique.

This algorithm is illustrated in FIG. 16. According to the receiver shown in FIG. 16 receives at an input 1600 a signal down converted by the RF tuner 52 and after the guard removal unit 56, the input signal has been stripped of all prefixes and postfixes. The received signal is fed two branches. On a first branch the received signal is delay by a number of samples equal to the useful part of the OFDM symbol by the delay unit 1601 so that the previous received spectrum sequence $R_{n-1}$ is transformed by a first FFT unit 1604. The received signal is also fed via a second branch so that each symbol as received is also transformed by a second FFT unit 1602, wherein the conjugate 1606 of the output of the first FFT unit 1604 is multiplied 1608 by the output of the FFT unit 1602. The result of the multiplier 1608 is then divided 1610 into the multiple of the PN sequence used for the current and previous symbols 1620, and fed into an TFFT unit 1612. Following the TFFT 1612, the IFFT transformed signal is input into a peak detector 1614 before being subtracted 1618 from the 2048p spectral output components.

The further processing of the peak position at the output of the peak detector i.e. the subtraction from 2048p can be avoided if instead $R_{n-1}(k)$ is divided by $R_n(k)$. In this case, the relevant equation using conjugation instead of division becomes:

$$R_{n-1}R^*_n = e^{j2\pi n/N_{FFT}} + H.Z.P_n.e^{-j\beta}.N_n^* + H^*.Z^*.P_{n-1}e^{j\alpha}.N_{n-1} + P_{n-1}.P_nN_{n-1}.N_n^*$$

Figure 17:
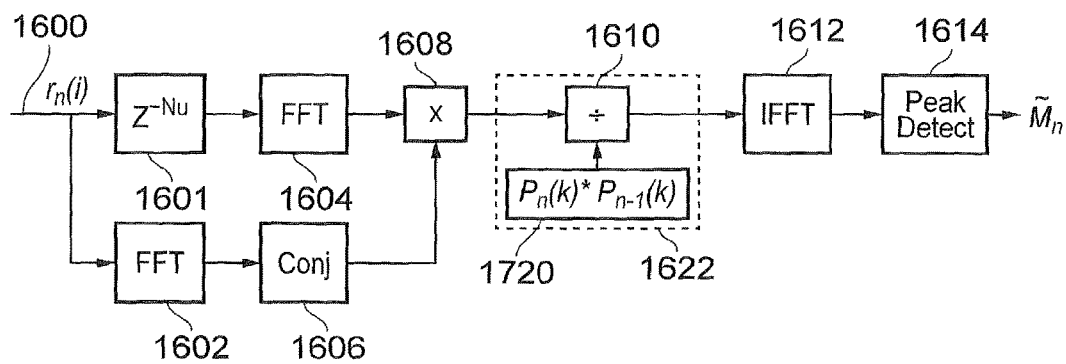
FIG. 17 is a schematic block diagram representation of a second method of frequency domain decoding of relative cyclic shift at a receiver in accordance with the present technique.

This approach is illustrated in FIG. 17.

FIG. 17 is substantially the same as FIG. 16, and so only the differences will be described. In contrast to FIG. 16, the receiver shown in FIG. 17 forms the conjugate of the currently received spectrum sequence $R_n$ which is conjugated 1606 and multiplied 1608 by the output of the of the FFT transformed previous received spectrum sequence $R_{n-1}$. The result of the multiplier 1608 is then divided 1610 by the multiple of the PN sequence used for the current and previous symbols 1720. No subtraction from 2048p is necessary here, and so the final output is received from the peak detector 1614.

As represented by the examples provided by FIGS. 16 and 17, embodiments of the present technique can provide an arrangement in which the primary signalling data is estimated by detecting the cyclical shift of the signature sequence carried by the frequency synchronisation OFDM symbol and the one primary signalling OFDM symbols. As represented by the example provided in FIG. 16, the FFT units 1602, 1604 are configured to convert successively a temporal length of a useful part each of the frequency synchronisation OFDM symbol and the one or more primary signalling OFDM symbols into the frequency domain. As will be appreciated, in other examples a single FFT unit could be used and operated sequential in place of the two FFT units 1602, 1604. The multiplier 1608 is configured to receive each of the frequency domain samples of a current one of the primary signalling OFDM symbols and to multiply each sample with the conjugate, produced by the conjugate 1606 of a corresponding sample of one of the frame synchronisation OFDM symbols or one of the one or more primary signalling OFDM symbols immediately preceding the current one of the primary signalling OFDM symbols to produce for each sub-carrier sample an intermediate sample. The IFFT unit 1612 is configured to convert the intermediate samples resulting from the current one of the primary OFDM symbols into the time domain. A cyclic shift detector formed from the peak detector 1614 is configured to estimate the primary signalling data conveyed by each of the one or more primary signalling OFDM symbols by detecting a cyclic shift of the signature sequence present in each of the one or more primary signalling OFDM symbols from a peak of the time domain intermediate samples.

According to example embodiments of the present technique therefore, a receiver can be configured to detect the primary signalling data by detecting the relative cyclic shift between the frequency synchronisation OFDM symbols and the primary signalling OFDM symbols which causes only additive noise to be present in the detection process. Accordingly an advantage is provided by the using conjugate multiplication as represented in FIGS. 16 and 17 because the signalling data can be correctly estimated by detecting the cyclic shift of the signature sequence at lower signal to noice ratios.

Figure 18:
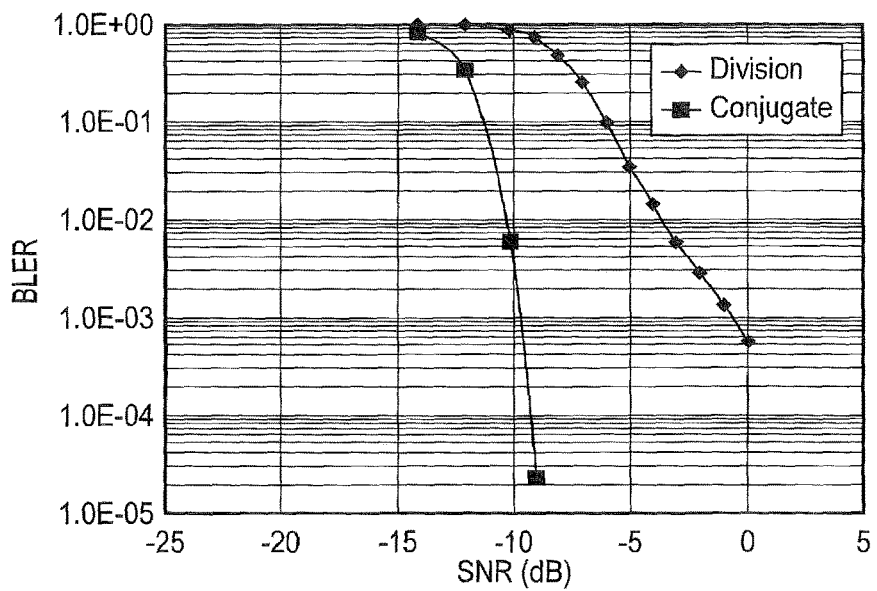
FIG. 18 is a block error rate vs. symbol-to-noise ratio graph illustrating the difference in performance between the frequency domain decoding algorithm which uses division compared to the methods which use a conjugate multiplication as illustrated by FIG. 16 and FIG. 17 in accordance with the present technique.

FIG. 18 is a block error rate vs. symbol-to-noise ratio graph illustrating the difference in performance between the frequency domain decoding algorithm which uses division compared to the methods which use a conjugate multiplication as illustrated by FIG. 16 and FIG. 17 in accordance with the present technique.

The plot is for an additive white Gaussian noise (AWGN) channel, and it can clearly be seen that the algorithms of conjugate multiplication as employed by embodiments of the present technique are vastly superior in terms of SNR to those which use actual division. The comparison is even more stark when there is multipath.

With the relative cyclic shift $\tilde{M}_n$ the transmitted parameters can be decoded in the following steps:

$N_b^n$—the number of bits carried in primary signalling OFDM symbol n is known

Convert $\tilde{M}_n$ into a bit vector $d = d_{N_p^n-1}{}^n \ldots d_9{}^n \ldots d_1{}^n d_0{}^n$ Desired decoded bit vector $b = b_{N_b^n-1}{}^n \ldots b_9{}^n \ldots b_1{}^n b_0{}^n$ Extract b from d using the following equation:

$$b_i = \begin{cases} d_{N_p^n-1} & i = 0 \\ d_{N_p^n} \oplus d_{N_p^n-1-i} & 1 \leq i < N_b^n \\ 0 & N_b^n \leq i < N_p^n - 1 \end{cases}$$

Frame Synchronisation at the Receiver: Narrowband

Narrowband or segment reception can be used when a transmitter using FDM divides the channel into frequency segments each of bandwidth $\omega_s$. In segment reception, the receiver uses a tuner bandwidth of only $\omega_s$ and therefore sees only $N_a^s = N_a/\gamma$ where $\gamma = W/\omega_s$ is the number of segments configured by the transmitter, W is the useful bandwidth of the channel Table 3 illustrates example numbers for the frame synchronisation OFDM symbol FFT sizes in Table I for the case when $\gamma = 32$.

TABLE III

Example number of subcarriers of frame synchronisation
OFDM symbol per segment in FDM

| FFT ($N_u$) | $N_a$ | $N_a^s$ |
|---|---|---|
| 512 | 433 | 14 |
| 1024 | 865 | 27 |
| 2048 | 1729 | 49 |
| 4096 | 3457 | 108 |
| 8192 | 6913 | 216 |

In narrowband reception, a receiver would tune only to the segment concerned. This is illustrated by a representation of signal transmitted with the structure by a transmitter in accordance with an embodiment of the present technique in FIG. 19 which shows a plot of frequency with respect to signal power for the frequency segmented OFDM symbols used to carry the secondary signalling and the payload data for the case when γ=7, with an example receiver shown in FIG. 20. The receiver shown in FIG. 20 corresponds to the example shown in FIG. 16 so that only the differences between FIGS. 16 and 19 will be described. As will be appreciated an example narrow band receiver can also be implemented for the example shown in FIG. 17 with corresponding changes being made.

Figure 19:
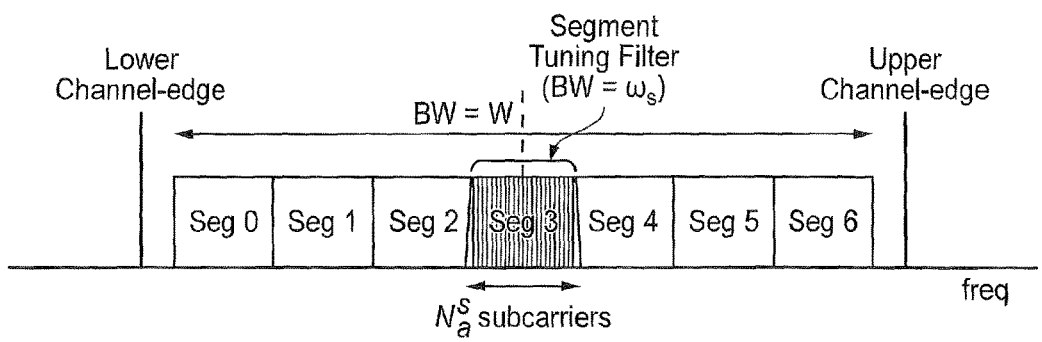
FIG. 19 provides an illustration of segmented OFDM reception in accordance with the present technique.
Figure 20:
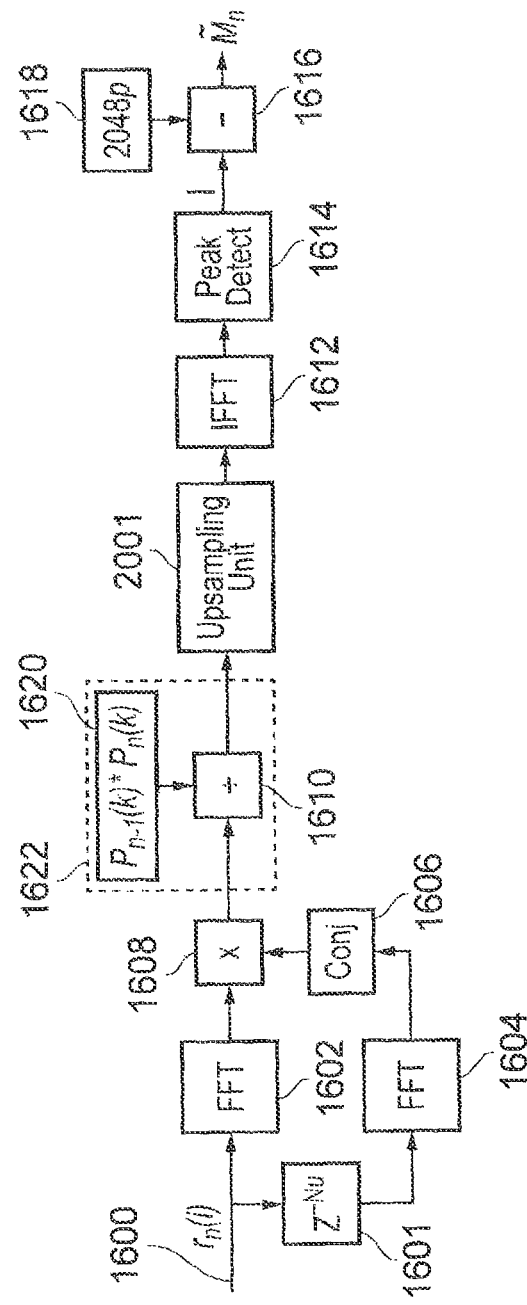
FIG. 20 is a schematic block diagram of a part of a narrow band receiver which is configured to detect a relative cyclic shift of a signature sequence in accordance with the present technique.

For the example of a narrowband receiver, shown in FIG. 20, the received signal can be sampled at a lower rate because the radio frequency detector/tuner 52 and receiver unit only receives a signal within the narrow band frequency Seg 3 of FIG. 19 and so the receiver input sampling rate can be reduced by the factor γ. Equivalently, the following adjustments are made for the example receiver shown in FIG. 20 with respect to the examples shown in FIGS. 16 and 17:

The delay unit 1601 at the input would be reduced to $N_u/\gamma$

The size of the FFT units 1602 1604 are accordingly reduced by $N_u/\gamma$

As the signal is sampled at a lower rate than the full-band radio frequency transmission bandwidth signal, the length of each of the CAB regions of the time-domain symbol are reduce by γ. Accordingly, all the delays and moving average filter lengths in FIG. 14 would also reduce by a factor γ. The scaling unit 1622 is also configured to divide (or multiply) a section of the PN-sequences with $P_n^*P_{n-1}$ with the samples from the received narrow band signal produced as an intermediate result at the output of the multiplier 1608.

Only the segment of the (ZC*PN) sequence that was modulated on the subcarriers of the particular segment (for example seg 3) has to be correlated for (ZC*PN) for frequency offset detection. This means that if the segment concerned is numbered as l∈0, 1, 2, . . . γ−1, then only the set of subcarriers $[Z(k)P_n(k)]$ where k=l$N_a^s$ . . . (l+1)$N_a^s$−1 should be correlated with the received R(k) in the flow graph of FIG. 15.

In detecting the relative cyclic shift, all the relevant subcarriers as described above will be processed using the scheme of either FIG. 16 or 17. Prior to performing the final IFFT, the segment of relevant sub-carriers resulting from the divide with $P_n^*P_{n-1}$ (or multiply with—since both are bipolar) from the scaling unit 1622 is fed into the IFFT unit 1612 with each subcarrier in its right position and all other subcarriers set to zero. That is to say that an upsampling unit 2001 is configured to append zero samples to the frequency domain samples provided at the output of the dividing unit 1610. The TFFT size applied by the TFFT unit 1612 is then applied as if a full band receiver was being used. The output would then provide the phase slope in a corresponding way to that for FIGS. 16 and 17. The height of the peak of the output of the IFFT unit 1612 is affected by the absolute number of subcarriers in the processed segment. This means that for primary signalling OFDM symbols using a low FFT size, the peak is significantly lower and so increases the risk of block errors compared to larger FFT sizes.

According to example embodiments of the present technique therefore, a radio frequency demodulation circuit of the receiver is configured to detect and to recover the radio signal within a bandwidth corresponding to one of the frequency segments of the one or more secondary signalling OFDM symbols and the one or more payload OFDM symbols. The inverse Fourier transform is configured to transform intermediate samples produced by multiplying the frequency domain samples of the current one of the primary signalling OFDM symbols with a conjugate of a previous one of the frequency synchronisation OFDM symbols (where each sample corresponds to a complex sample of each of the detected sub-carriers of the segment of the OFDM symbol). The intermediate samples are transformed into the time domain and represent a result from the current one of the one or more primary OFDM symbols but upsampled in accordance with a bandwidth which corresponds to the radio frequency transmission bandwidth. The cyclic shift detector can thereby detect the cyclic shift of the signature sequence from the time domain intermediate samples generated for the intermediate samples with a bandwidth increased to the radio frequency transmission bandwidth.

According to one example therefore an up-sampler 2001 is configured to receive the intermediate samples in the frequency domain and to append zero samples to the intermediate samples, which correspond to an equivalent in the frequency domain of the radio frequency transmission bandwidth.

As will be appreciated from the above explanation embodiments of the present technique can provide an arrangement for allowing both time-division multiplexing and frequency-division multiplexing of services within the same radiofrequency channels. This is achieved through the employment of the proposed frame structure of FIG. 5, and according to embodiments of the present technique, which allow for a greater capacity for mobile services.

The following numbered paragraphs define further example aspects and features of the present technique:

Paragraph 1. A receiver for detecting and recovering payload data from a received signal, the receiver comprising radio frequency demodulation circuitry configured to detect and to recover the received signal, the received signal having been formed and transmitted by a transmitter to carry the payload data from a plurality of different channels as Orthogonal Frequency Division Multiplexed (OFDM) symbols in one or more of a plurality of transmission frames, each of the transmission frames comprising a frame synchronisation OFDM symbol, followed by one or more primary signalling OFDM symbols, then one or more secondary signalling OFDM symbols followed by one or more payload OFDM symbols, the one or more payload OFDM symbols carrying payload data from one of a plurality of time frames for each of the plurality of different channels, the frame synchronisation OFDM symbol and the one or more primary signalling OFDM symbols having been transmitted in a bandwidth which is equal to a radio frequency transmission bandwidth, and the one or more secondary signalling OFDM symbols and the one or more payload OFDM symbols having been transmitted in the radio frequency transmission bandwidth with each of the one or more secondary signalling OFDM symbols and the one or more payload OFDM symbols being divided into a plurality of frequency segments, each of the frequency segments carrying payload data from a different channel, and the one or more secondary signalling OFDM symbols in each frequency segment carrying one instance of a plurality of instances of physical layer signalling for detecting and recovering the payload data for each channel transmitted in the frequency segment from a corresponding segment of the one or more payload OFDM symbols, and the one or more primary signalling OFDM symbols carry primary signalling data for detecting the secondary signalling OFDM symbols, the frame synchronisation OFDM symbol and the one or more primary signalling OFDM symbols having been modulated with a signature sequence, the signature sequence of the one or more primary signalling OFDM symbols having been cyclically shifted with respect to each of a preceding one of the frequency synchronisation OFDM symbol or the one or more primary signalling OFDM symbols, with the cyclical shift primary signalling data carried in the one or more primary signalling OFDM symbols, a Fourier transformer configured to convert successively a temporal length of a useful part each of the frequency synchronisation OFDM symbol and the one or more primary signalling OFDM symbols into the frequency domain, a multiplier configured to receive each of the frequency domain samples of a current one of the primary signalling OFDM symbols and to multiply each sample with the conjugate of a corresponding sample of one of the frame synchronisation OFDM symbols or one of the one or more primary signalling OFDM symbols immediately preceding the current one of the primary signalling OFDM symbols to produce for each sub-carrier sample an intermediate sample, an inverse Fourier transformer configured to convert the intermediate samples resulting from the current one of the primary OFDM symbols into the time domain, and a cyclic shift detector configured to estimate the primary signalling data conveyed by each of the one or more primary signalling OFDM symbols by detecting a cyclic shift of the signature sequence present in each of the one or more primary signalling OFDM symbols from a peak of the time domain intermediate samples.

Paragraph 2. A receiver according to paragraph 1, wherein the radio frequency demodulation circuit is configured to detect and to recover the received signal within a bandwidth corresponding to one of the frequency segments of the one or more secondary signalling OFDM symbols and the one or more payload OFDM symbols, and the inverse Fourier transform is configured to transform the intermediate sample resulting from the current one of the one or more primary OFDM symbols into the time domain in accordance with a bandwidth which corresponds to the radio frequency transmission bandwidth, whereby the cyclic shift detector can detect the cyclic shift of the signature sequence from the time domain intermediate samples generated for the intermediate samples with a bandwidth increased to the radio frequency transmission bandwidth.

Paragraph 3. A receiver according to paragraph 2, comprising an up-sampler configured to receive the intermediate samples in the frequency domain and to append zero samples to the intermediate samples, which correspond to an equivalent in the frequency domain of the radio frequency transmission bandwidth.

Paragraph 4. A receiver according to any of paragraphs 1 to 3, comprising a scaling unit configured to redeuce an effect of the signature sequence in the frequency domain from the intermediate samples resulting from the current one of the one or more primary OFDM symbols, by combining each corresponding coefficient of the signature sequence present in the current one of the primary signalling OFDM symbols and the signature sequence present in the immediately preceding OFDM symbol and scaling each intermediate sample with the combination.

Paragraph 5. A receiver according to any of paragraphs 1 to 3, wherein the signature sequence is formed from a pseudo-random binary sequence of bipolar binary digits, and the receiver comprises a scaling unit configured to redeuce an effect of the signature sequence in the frequency domain from the intermediate samples resulting from the frequency segment corresponding to the current one of the one or more primary OFDM symbols, by combining each corresponding bipolar binary digit of the pseudo-random binary sequence present in the corresponding segment of the current one of the primary signalling OFDM symbols and the binary digit of the pseudo-random binary sequence present in the corresponding frequency segment of the immediately preceding OFDM symbol and scaling each intermediate sample with the combination.

Paragraph 6. A receiver according to paragraph 5, wherein the scaling unit includes a divider configure to divide each intermediate sample with the combination of the bipolar binary digits of the pseudo-random sequence of the signature sequence of the current one of the one or more primary OFDM symbols and the pseudo-random binary sequence present in the immediately preceding OFDM symbol.

Paragraph 7. A receiver according to paragraph 1, wherein the signature sequence comprises a combination of a Zadoff-chu sequence and a pseudorandom-noise sequence.

Paragraph 8. A method of detecting and recovering payload data from a received signal, the method comprising detecting and recovering the received signal, the received signal having been formed and transmitted by a transmitter to carry the payload data from a plurality of different channels as Orthogonal Frequency Division Multiplexed (OFDM) symbols in one or more of a plurality of transmission frames, each of the transmission frames comprising a frame synchronisation OFDM symbol, followed by one or more primary signalling OFDM symbols, then one or more secondary signalling OFDM symbols followed by one or more payload OFDM symbols, the one or more payload OFDM symbols carrying payload data from one of a plurality of time frames for each of the plurality of different channels, the frame synchronisation OFDM symbol and the one or more primary signalling OFDM symbols having been transmitted in a bandwidth which is equal to a radio frequency transmission bandwidth, and the one or more secondary signalling OFDM symbols and the one or more payload OFDM symbols having been transmitted in the radio frequency transmission bandwidth with each of the one or more secondary signalling OFDM symbols and the one or more payload OFDM symbols being divided into a plurality of frequency segments, each of the frequency segments carrying payload data from a different channel, and the one or more secondary OFDM symbols in each frequency segment carrying one instance of a plurality of instances of physical layer signalling for detecting and recovering the payload data for each channel transmitted in the frequency segment from a corresponding segment of the one or more payload OFDM symbols, and the one or more primary signalling OFDM symbols carry primary signalling data for detecting the secondary signalling OFDM symbols, the frame synchronisation OFDM symbol and the one or more primary signalling OFDM symbols having been modulated with a signature sequence, the signature sequence of the one or more primary signalling OFDM symbols having been cyclically shifted with respect to each of a preceding one of the frequency synchronisation OFDM symbol or the one or more primary signalling OFDM symbols, with the cyclical shift primary signalling data carried in the one or more primary signalling OFDM symbols, using a Fourier transform to convert successively a temporal length of a useful part each of the frequency synchronisation OFDM symbol and the one or more primary signalling OFDM symbols into the frequency domain, mutiplying each of the frequency domain samples of a current one of the subsequent primary signalling OFDM symbols with the conjugate of a corresponding sample of one of the frame synchronisation OFDM symbols or one of the one or more primary signalling OFDM symbols immediately preceding the current one of the primary signalling OFDM symbols to produce for each sub-carrier sample an intermediate sample, using an inverse Fourier transform to convert the intermediate samples resulting from the current one of the subsequent primary OFDM symbols into the time domain, and estimating the primary signalling data conveyed by each of the one or more primary signalling OFDM symbols by detecting a cyclic shift of the signature sequence present in each of the one or more primary signalling OFDM symbols from a peak of the time domain intermediate samples.

Paragraph 9. A method according to paragraph 8, wherein
the detecting and recovering the radio signal comprises detecting and recovering the radio signal from within a bandwidth corresponding to one of the frequency segments of the one or more secondary signalling OFDM symbols and the one or more payload OFDM symbols, and the using the inverse Fourier transform to convert the intermediate samples resulting from the current one of the subsequent primary OFDM symbols into the time domain comprises transforming the intermediate sample resulting from the current one of the one or more primary OFDM symbols into the time domain in accordance with a bandwidth which corresponds to the radio frequency transmission bandwidth, whereby the cyclic shift of the signature sequence can be detected from the time domain intermediate samples generated for the intermediate samples with a bandwidth increased to the radio frequency transmission bandwidth.

Paragraph 10. A method according to paragraph 9, wherein
the transforming the intermediate sample resulting from the current one of the one or more primary OFDM symbols into the time domain in accordance with a bandwidth which corresponds to the radio frequency transmission bandwidth comprises receiving the intermediate samples in the frequency domain and appending zero samples to the intermediate samples, which correspond to an equivalent in the frequency domain of the radio frequency transmission bandwidth.

Paragraph 11. A method according to any of paragraphs 8, 9 or 10, comprising
reducing an effect of the signature sequence in the frequency domain from the intermediate samples resulting from the frequency segment of the current one of the one or more primary OFDM symbols, by combining each corresponding coefficient of the signature sequence present in the current one of the primary signalling OFDM symbols corresponding to the frequency segment and the signature sequence present in the immediately preceding OFDM symbol corresponding to the frequency segment and scaling each intermediate sample with the combination.

Paragraph 12. A method according to any of paragraphs 8, 9 or 10, wherein the signature sequence is formed from a pseudo-random binary sequence of bipolar binary digits, and the method includes reducing an effect of the signature sequence in the frequency domain from the intermediate samples resulting from the frequency segment of the current one of the one or more primary OFDM symbols, by combining each corresponding bipolar binary digit of the pseudo-random binary sequence present in the current one of the primary signalling OFDM symbols for the corresponding frequency segment and the binary digit of the pseudo-random binary sequence present in the immediately preceding OFDM symbol for the corresponding frequency segment and scaling each intermediate sample with the combination.

Paragraph 13. A method according to paragraph 12, wherein the scaling each intermediate sample with the combination includes dividing each intermediate sample with the combination of the bipolar binary digits of the pseudo-random sequence of the signature sequence of the current one of the one or more primary OFDM symbols and the pseudo-random binary sequence present in the immediately preceding OFDM symbol.

Paragraph 14. A method according to paragraph 8, wherein the signature sequence comprises a combination of a Zadoff-chu sequence and a pseudorandom-noise sequence.

The following numbered clauses define yet further example aspects and features of the present technique:

Clause 1. A transmitter for transmitting payload data using Orthogonal Frequency Division Multiplexed, OFDM, symbols, the transmitter comprising a frame builder configured to receive the payload data to be transmitted from each of a plurality of different channels and to form the payload data from each channel for each of a plurality of time frames into a plurality of payload data frames for transmission, a modulator configured to generate, for each of the plurality of payload data frames, a frame synchronisation OFDM symbol, one or more primary signalling OFDM symbols, one or more secondary signalling OFDM symbols, and to modulate one or more payload OFDM symbols with the payload data from each of the channels, and a transmission unit for transmitting each of the payload data frames as a plurality of transmission frames, each of the transmission frames comprising the one or more payload OFDM symbols, preceded with the frame synchronisation OFDM symbol, followed by the one or more primary signalling OFDM symbols, then the one or more secondary signalling OFDM symbols followed by the one or more payload OFDM symbols, wherein the frame synchronisation OFDM symbol and the one or more primary signalling OFDM symbols are transmitted in a bandwidth which is equal to a radio frequency transmission bandwidth, and the one or more secondary signalling OFDM symbols and the one or more payload OFDM symbols are transmitted in the radio frequency transmission bandwidth with each of the one or more secondary signalling OFDM symbols and the one or more payload OFDM symbols being divided in frequency to provide a plurality of frequency segments, each of the frequency segments carrying payload data from a different channel, the one or more secondary signalling OFDM symbols in each frequency segment carrying one instance of a plurality of instances of physical layer signalling for detecting and recovering the payload data for each channel transmitted in the set of frequency segments from the one or more payload OFDM symbols, and the one or more primary signalling OFDM symbols carrying primary signalling data for detecting the secondary signalling OFDM symbols.

Clause 2. A transmitter as in Clause 1, the transmitter comprising
a signature sequence combiner configured to modulate the frame synchronisation OFDM symbol with a signature sequence and to modulate each of the one or more primary signalling OFDM symbols and the one or more time domain primary signalling OFDM symbols cyclically shifted with respect to the preceding symbol, with the cyclical shift of the one or more time domain primary signalling OFDM symbols representing the primary signalling data carried in the one or more primary signalling OFDM symbols.

Clause 3. A transmitter as in Clause 1 or 2, wherein the primary signalling data includes an indication of the number of frequency segments.

Clause 4. A transmitter as in any of Clauses 1, 2 or 3, wherein the primary signalling data includes an indication of an emergency situation.

Clause 5. A transmitter as in any of Clauses 1, 2, 3 or 4, wherein the primary signalling data includes an indication of a Fourier transform size and a guard interval used for the one or more secondary signalling OFDM symbols and the one or more payload OFDM symbols.

Clause 6. A transmitter as in any of Clauses 1 to 5, wherein the modulator in combination with the transmitter is configured to form the frame synchronisation OFDM symbols in accordance with a first time domain structure comprising a first portion, C, of samples of a useful part of the frame synchronisation OFDM symbol, A, comprised of the useful part of the frame synchronisation OFDM symbol, and part, B, of the first portion is copied to form a postamble of the frame synchronisation OFDM symbol.

Clause 7. A transmitter as in any of Clauses 1 to 6, wherein the modulator in combination with the transmitter is configured to form the one or more primary signalling OFDM symbols with a first portion, B, of samples of a useful part of the primary signalling OFDM symbol, A, comprised of the useful part of the primary signalling OFDM symbol, and part, C, of a useful part of the primary signalling OFDM symbol, A, is copied to form a second part of the primary signalling OFDM symbol.

Clause 8. A transmitter as in Clause 1, wherein the signature sequence comprises a combination of a Zadoff-chu sequence and a pseudorandom-noise sequence.

Clause 9. A method of transmitting payload data using Orthogonal Frequency Division Multiplexed, OFDM, symbols, the method comprising
receiving the payload data to be transmitted from each of a plurality of different channel,
forming the payload data from each channel for each of a plurality of time frames into a plurality of payload data frames for transmission,
generating, for each of the plurality of payload data frames, a frame synchronisation OFDM symbol, one or more primary signalling OFDM symbols, one or more secondary signalling OFDM symbols,
modulating one or more payload OFDM symbols with the payload data from each of the channels,
transmitting each of the payload data frames as a plurality of transmission frames, each of the transmission frames comprising the one or more payload OFDM symbols, preceded with the frame synchronisation OFDM symbol, followed by the one or more primary signalling OFDM symbols, then the one or more secondary signalling OFDM symbols followed by the one or more payload OFDM symbols, wherein
the frame synchronisation OFDM symbol and the one or more primary signalling OFDM symbols are transmitted in a bandwidth which is equal to a radio frequency transmission bandwidth, and the one or more secondary signalling OFDM symbols and the one or more payload OFDM symbols are transmitted in the radio frequency transmission bandwidth with each of the one or more secondary signalling OFDM symbols and the one or more payload OFDM symbols being divided in frequency to provide a plurality of frequency segments, each of the frequency segments carrying payload data from a different channel, the one or more secondary signalling OFDM symbols in each frequency segment carrying one instance of a plurality of instances of physical layer signalling for detecting and recovering the payload data for each channel transmitted in the set of frequency segments from the one or more payload OFDM symbols, and the one or more primary signalling OFDM symbols carrying primary signalling data for detecting the secondary signalling OFDM symbols.

Clause 10. A method as in Clause 1, the method comprising
modulating the frame synchronisation OFDM symbol with a signature sequence, and
modulating each of the one or more primary signalling OFDM symbols and the one or more time domain primary signalling OFDM symbols cyclically shifted with respect to the preceding symbol, with the cyclical shift of the one or more time domain primary signalling OFDM symbols representing the primary signalling data carried in the one or more primary signalling OFDM symbols.

Clause 11. A method as in Clause 1 or 2, wherein the primary signalling data includes an indication of the number of frequency segments.

Clause 12. A method as in any of Clauses 1, 2 or 3, wherein the primary signalling data includes an indication of an emergency situation.

Clause 13. A method as in any of Clauses 1, 2, 3 or 4, wherein the primary signalling data includes an indication of a Fourier transform size and a guard interval used for the one or more secondary signalling OFDM symbols and the one or more payload OFDM symbols.

Clause 14. A method as in any of Clauses 1 to 5, the method comprising
forming the frame synchronisation OFDM symbols in accordance with a first time domain structure comprising a first portion, C, of samples of a useful part of the frame synchronisation OFDM symbol, A, comprised of the useful part of the frame synchronisation OFDM symbol, and part, B, of the first portion is copied to form a postamble of the frame synchronisation OFDM symbol.

Clause 15. A method as in any of Clauses 1 to 6, the method comprising
forming the one or more primary signalling OFDM symbols with a first portion, B, of samples of a useful part of the primary signalling OFDM symbol, A, comprised of the useful part of the primary signalling OFDM symbol, and part, C, of a useful part of the primary signalling OFDM symbol, A, is copied to form a second part of the primary signalling OFDM symbol.

Clause 16. A method as in Clause 1, wherein the signature sequence comprises a combination of a Zadoff-chu sequence and a pseudorandom-noise sequence.

Clause 17. A receiver for detecting and recovering payload data from a received signal, the receiver comprising a radio frequency demodulation circuit configured to detect and to recover the received signal, the received signal having been formed and transmitted by a transmitter to carry the payload data from a plurality of different channels as Orthogonal Frequency Division Multiplexed (OFDM) symbols in one or more of a plurality of transmission frames, each of the transmission frames comprising a frame synchronisation OFDM symbol, followed by one or more primary signalling OFDM symbols, then one or more secondary OFDM symbols followed by one or more payload OFDM symbols, the one or more payload OFDM symbols carrying payload data from one of a plurality of time frames for each of the plurality of different channels, the frame synchronisation OFDM symbol and the one or more primary signalling OFDM symbols having been transmitted a bandwidth which is equal to a radio frequency transmission bandwidth, and the one or more secondary signalling OFDM symbols and the one or more payload OFDM symbols having been transmitted in the radio frequency transmission bandwidth with each of the one or more secondary signalling OFDM symbols and the one or more payload OFDM symbols being divided in frequency to provide a plurality of frequency segments, each of the frequency segments providing payload data from a different channel and one instance of a plurality of instances of physical layer signalling for detecting and recovering the payload data for each channel transmitted in each frequency segment from a corresponding segment of the one or more payload OFDM symbols, and the one or more primary signalling OFDM symbols carry primary signalling data for detecting the secondary signalling OFDM symbols, a detector circuit configured to detect from the frequency synchronisation OFDM symbols a synchronisation timing for converting a temporal length of a useful part of the one or more primary signalling OFDM symbols or the payload OFDM symbols into the frequency domain, a forward Fourier transformer configured to convert the temporal length of the one or more primary signalling OFDM symbols or the payload OFDM symbols from the time domain into the frequency domain in accordance with the identified synchronisation timing, and a demodulator circuit configured to recover the primary signalling data from the primary signalling OFDM symbols and to use the primary signalling data to detect and to recover the physical layer signalling data from one of the frequency segments of the one or more secondary signalling OFDM symbols and to recover the payload data for one time frame from one of the frequency segments of the one of more payload OFDM symbols.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Various further aspects and features of the present technique are defined in the appended claims and various combinations of the features of the dependent claims may be made with those of the independent claims other than the specific combinations recited for the claim dependency.

Modifications may also be made to the embodiments hereinbefore described without departing from the scope of the present technique.

[1] ATSC Standard: A/321, System Discovery and Signaling Doc. A/321:2016 23 Mar. 2016

[2] ATSC Candidate Standard: System Discovery and Signaling (Doc. A/321 Part 1), Advanced Television Systems Committee, 15 Jul. 2015.

The invention claimed is:

1. A receiver for detecting and recovering payload data from a received signal, the receiver comprising radio frequency demodulation circuitry configured to detect and to recover the received signal, the received signal carrying the payload data from a plurality of different channels as Orthogonal Frequency Division Multiplexed (OFDM) symbols in one or more of a plurality of transmission frames, each of the transmission frames comprising a frame synchronization OFDM symbol, followed by one or more primary signaling OFDM symbols, then one or more secondary signaling OFDM symbols followed by one or more payload OFDM symbols, the one or more payload OFDM symbols carrying payload data from one of a plurality of time frames for each of the plurality of different channels, and the one or more primary signaling OFDM symbols carry primary signaling data for detecting the secondary signaling OFDM symbols, the frame synchronization OFDM symbol and the one or more primary signaling OFDM symbols having been modulated with a signature sequence, the signature sequence of the one or more primary signaling OFDM symbols having been cyclically shifted with respect to each of a preceding one of the frequency synchronization OFDM symbol or the one or more primary signaling OFDM symbols, with the cyclical shift primary signaling data carried in the one or more primary signaling OFDM symbols, Fourier transformer circuitry configured to convert successively a temporal length of a useful part each of the frequency synchronization OFDM symbol and the one or more primary signaling OFDM symbols into a frequency domain, multiplier circuitry configured to receive each of the frequency domain samples of a current one of the primary signaling OFDM symbols and to multiply each sample with the conjugate of a corresponding sample of one of the frame synchronization OFDM symbols or one of the one or more primary signaling OFDM symbols immediately preceding the current one of the primary signaling OFDM symbols to produce for each sub-carrier sample an intermediate sample, inverse Fourier transformer circuitry configured to convert the intermediate samples resulting from the current one of the primary OFDM symbols into a time domain, and cyclic shift detector circuitry configured to estimate the primary signaling data conveyed by each of the one or more primary signaling OFDM symbols by detecting a cyclic shift of the signature sequence present in each of the one or more primary signaling OFDM symbols from a peak of the time domain intermediate samples.

2. The receiver as claimed in claim 1, wherein the frame synchronization OFDM symbol and the one or more primary signaling OFDM symbols have been transmitted in a bandwidth which is equal to a radio frequency transmission bandwidth, and the one or more secondary signaling OFDM symbols and the one or more payload OFDM symbols have been transmitted in the radio frequency transmission bandwidth with each of the one or more secondary signaling OFDM symbols and the one or more payload OFDM symbols being divided into a plurality of frequency segments, each of the frequency segments carrying payload data from a different channel, and the one or more secondary signaling OFDM symbols in each frequency segment carrying one instance of a plurality of instances of physical layer signaling for detecting and recovering the payload data for each channel transmitted in the frequency segment from a corresponding segment of the one or more payload OFDM symbols, and the radio frequency demodulation circuitry is configured to detect and to recover the received signal within a bandwidth corresponding to one of the frequency segments of the one or more secondary signaling OFDM symbols and the one or more payload OFDM symbols, and the inverse Fourier transformer circuitry is configured to transform the intermediate sample resulting from the current one of the one or more primary OFDM symbols into the time domain in accordance with a bandwidth which corresponds to the radio frequency transmission bandwidth, whereby the cyclic shift detector can detect the cyclic shift of the signature sequence from the time domain intermediate samples generated for the intermediate samples with a bandwidth increased to the radio frequency transmission bandwidth.

3. The receiver as claimed in claim 2, comprising up-sampler circuitry configured to receive the intermediate samples in the frequency domain and to append zero samples to the intermediate samples, which correspond to an equivalent in the frequency domain of the radio frequency transmission bandwidth.

4. The receiver as claimed in claim 1, comprising
scaling circuitry configured to reduce an effect of the signature sequence in the frequency domain from the intermediate samples resulting from the current one of the one or more primary OFDM symbols, by combining each corresponding coefficient of the signature sequence present in the current one of the primary signaling OFDM symbols and the signature sequence present in the immediately preceding OFDM symbol and scaling each intermediate sample with the combination.

5. The receiver as claimed in claim 1, wherein the signature sequence is formed from a pseudo-random binary sequence of bipolar binary digits, and the receiver comprises
scaling circuitry configured to reduce an effect of the signature sequence in the frequency domain from the intermediate samples resulting from the frequency segment corresponding to the current one of the one or more primary OFDM symbols, by combining each corresponding bipolar binary digit of the pseudo-random binary sequence present in the corresponding segment of the current one of the primary signaling OFDM symbols and the binary digit of the pseudo-random binary sequence present in the corresponding frequency segment of the immediately preceding OFDM symbol and scaling each intermediate sample with the combination.

6. The receiver as claimed in claim 5, wherein the scaling circuitry includes a divider configured to divide each intermediate sample with the combination of the bipolar binary digits of the pseudo-random sequence of the signature sequence of the current one of the one or more primary OFDM symbols and the pseudo-random binary sequence present in the immediately preceding OFDM symbol.

7. The receiver as claimed in claim 1, wherein the signature sequence comprises a combination of a Zadoff-chu sequence and a pseudorandom-noise sequence.

8. A method of detecting and recovering payload data from a received signal, the method comprising
detecting and recovering the received signal by circuitry, the received signal carrying the payload data from a plurality of different channels as Orthogonal Frequency Division Multiplexed (OFDM) symbols in one or more of a plurality of transmission frames, each of the transmission frames comprising a frame synchronization OFDM symbol, followed by one or more primary signaling OFDM symbols, then one or more secondary signaling OFDM symbols followed by one or more payload OFDM symbols, the one or more payload OFDM symbols carrying payload data from one of a plurality of time frames for each of the plurality of different channels, and the one or more secondary OFDM symbols in each frequency segment carrying one instance of a plurality of instances of physical layer signaling for detecting and recovering the payload data for each channel transmitted in the frequency segment from a corresponding segment of the one or more payload OFDM symbols, and the one or more primary signaling OFDM symbols carry primary signaling data for detecting the secondary signaling OFDM symbols, the frame synchronization OFDM symbol and the one or more primary signaling OFDM symbols having been modulated with a signature sequence, the signature sequence of the one or more primary signaling OFDM symbols having been cyclically shifted with respect to each of a preceding one of the frequency synchronization OFDM symbol or the one or more primary signaling OFDM symbols, with the cyclical shift primary signaling data carried in the one or more primary signaling OFDM symbols, using a Fourier transform to convert successively a temporal length of a useful part each of the frequency synchronization OFDM symbol and the one or more primary signaling OFDM symbols into a frequency domain, multiplying each of the frequency domain samples of a current one of the subsequent primary signaling OFDM symbols with the conjugate of a corresponding sample of one of the frame synchronization OFDM symbols or one of the one or more primary signaling OFDM symbols immediately preceding the current one of the primary signaling OFDM symbols to produce for each sub-carrier sample an intermediate sample, using an inverse Fourier transform to convert the intermediate samples resulting from the current one of the subsequent primary OFDM symbols into the time domain, and estimating the primary signaling data conveyed by each of the one or more primary signaling OFDM symbols by detecting a cyclic shift of the signature sequence present in each of the one or more primary signaling OFDM symbols from a peak of the time domain intermediate samples.

9. The method as claimed in claim 8, wherein the frame synchronization OFDM symbol and the one or more primary signaling OFDM symbols have been transmitted in a bandwidth which is equal to a radio frequency transmission bandwidth, and the one or more secondary signaling OFDM symbols and the one or more payload OFDM symbols have been transmitted in the radio frequency transmission bandwidth with each of the one or more secondary signaling OFDM symbols and the one or more payload OFDM symbols being divided into a plurality of frequency segments, each of the frequency segments carrying payload data from a different channel, and the detecting and recovering the radio signal comprises detecting and recovering the received signal from within a bandwidth corresponding to one of the frequency segments of the one or more secondary signaling OFDM symbols and the one or more payload OFDM symbols, and the using the inverse Fourier transform to convert the intermediate samples resulting from the current one of the subsequent primary OFDM symbols into the time domain comprises transforming the intermediate sample resulting from the current one of the one or more primary OFDM symbols into the time domain in accordance with a bandwidth which corresponds to the radio frequency transmission bandwidth, whereby the cyclic shift of the signature sequence can be detected from the time domain intermediate samples generated for the intermediate samples with a bandwidth increased to the radio frequency transmission bandwidth.

10. The method as claimed in claim 9, wherein the transforming the intermediate sample resulting from the current one of the one or more primary OFDM symbols into the time domain in accordance with a bandwidth which corresponds to the radio frequency transmission bandwidth comprises receiving the intermediate samples in the frequency domain and appending zero samples to the intermediate samples, which correspond to an equivalent in the frequency domain of the radio frequency transmission bandwidth.

11. The method as claimed in claim 8, comprising
reducing an effect of the signature sequence in the frequency domain from the intermediate samples resulting from the frequency segment of the current one of the one or more primary OFDM symbols, by combining each corresponding coefficient of the signature sequence present in the current one of the primary signaling OFDM symbols corresponding to the frequency segment and the signature sequence present in the immediately preceding OFDM symbol corresponding to the frequency segment and scaling each intermediate sample with the combination.

12. The method as claimed in claim 8, wherein the signature sequence is formed from a pseudo-random binary sequence of bipolar binary digits, and the method includes
reducing an effect of the signature sequence in the frequency domain from the intermediate samples resulting from the frequency segment of the current one of the one or more primary OFDM symbols, by combining each corresponding bipolar binary digit of the pseudo-random binary sequence present in the current one of the primary signaling OFDM symbols for the corresponding frequency segment and the binary digit of the pseudo-random binary sequence present in the immediately preceding OFDM symbol for the corresponding frequency segment and scaling each intermediate sample with the combination.

13. The method as claimed in claim 12, wherein the scaling each intermediate sample with the combination includes dividing each intermediate sample with the combination of the bipolar binary digits of the pseudo-random sequence of the signature sequence of the current one of the one or more primary OFDM symbols and the pseudo-random binary sequence present in the immediately preceding OFDM symbol.

14. The method as claimed in claim 8, wherein the signature sequence comprises a combination of a Zadoff-chu sequence and a pseudorandom-noise sequence.

15. A receiver for detecting and recovering payload data from a received signal, the receiver comprising
a radio frequency demodulation circuit configured to detect and to recover the received signal, the received signal carrying the payload data from a plurality of different channels as Orthogonal Frequency Division Multiplexed (OFDM) symbols in one or more of a plurality of transmission frames, each of the transmission frames comprising a frame synchronization OFDM symbol, followed by one or more primary signaling OFDM symbols, then one or more secondary OFDM symbols followed by one or more payload OFDM symbols, the one or more payload OFDM symbols carrying payload data from one of a plurality of time frames for each of the plurality of different channels, the frame synchronization OFDM symbol and the one or more primary signaling OFDM symbols having been transmitted a bandwidth which is equal to a radio frequency transmission bandwidth, and the one or more secondary signaling OFDM symbols and the one or more payload OFDM symbols having been transmitted in the radio frequency transmission bandwidth with each of the one or more secondary signaling OFDM symbols and the one or more payload OFDM symbols being divided in frequency to provide a plurality of frequency segments, each of the frequency segments providing payload data from a different channel and one instance of a plurality of instances of physical layer signaling for detecting and recovering the payload data for each channel transmitted in each frequency segment from a corresponding segment of the one or more payload OFDM symbols, and the one or more primary signaling OFDM symbols carry primary signaling data for detecting the secondary signaling OFDM symbols, detector circuitry configured to detect from the frequency synchronization OFDM symbols a synchronization timing for converting a temporal length of a useful part of the one or more primary signaling OFDM symbols or the payload OFDM symbols into a frequency domain, forward Fourier transformer circuitry configured to convert the temporal length of the one or more primary signaling OFDM symbols or the payload OFDM symbols from a time domain into the frequency domain in accordance with the identified synchronization timing, and demodulator circuitry configured to recover the primary signaling data from the primary signaling OFDM symbols and to use the primary signaling data to detect and to recover the physical layer signaling data from one of the frequency segments of the one or more secondary signaling OFDM symbols and to recover the payload data for one time frame from one of the frequency segments of the one of more payload OFDM symbols.

16. A method for detecting and recovering payload data from a received signal, the method comprising detecting and recovering the received signal, the received signal carrying the payload data from a plurality of different channels as Orthogonal Frequency Division Multiplexed (OFDM) symbols in one or more of a plurality of transmission frames, each of the transmission frames comprising a frame synchronization OFDM symbol, followed by one or more primary signaling OFDM symbols, then one or more secondary OFDM symbols followed by one or more payload OFDM symbols, the one or more payload OFDM symbols carrying payload data from one of a plurality of time frames for each of the plurality of different channels, the frame synchronization OFDM symbol and the one or more primary signaling OFDM symbols having been transmitted a bandwidth which is equal to a radio frequency transmission bandwidth, and the one or more secondary signaling OFDM symbols and the one or more payload OFDM symbols having been transmitted in the radio frequency transmission bandwidth with each of the one or more secondary signaling OFDM symbols and the one or more payload OFDM symbols being divided in frequency to provide a plurality of frequency segments, each of the frequency segments providing payload data from a different channel and one instance of a plurality of instances of physical layer signaling for detecting and recovering the payload data for each channel transmitted in each frequency segment from a corresponding segment of the one or more payload OFDM symbols, and the one or more primary signaling OFDM symbols carry primary signaling data for detecting a secondary signaling OFDM symbols, detecting from the frequency synchronization OFDM symbols a synchronization timing for converting a temporal length of a useful part of the one or more primary signaling OFDM symbols or the payload OFDM symbols into a frequency domain, converting the temporal length of the one or more primary signaling OFDM symbols or the payload OFDM symbols from a time domain into the frequency domain in accordance with the identified synchronization timing, and recovering the primary signaling data from the primary signaling OFDM symbols and using the primary signaling data to detect and to recover the physical layer signaling data from one of the frequency segments of the one or more secondary signaling OFDM symbols and recovering the payload data for one time frame from one of the frequency segments of the one of more payload OFDM symbols.

* * * * *